(12) United States Patent  
Eaton

(10) Patent No.: US 9,419,444 B2
(45) Date of Patent: Aug. 16, 2016

(54) WIRELESS CHARGING AND COMMUNICATION WITH POWER SOURCE DEVICES AND POWER CHARGE DEVICES IN A COMMUNICATION SYSTEM

(75) Inventor: Eric Thomas Eaton, Lake Worth, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 1249 days.

(21) Appl. No.: 13/253,478

(22) Filed: Oct. 5, 2011

(65) Prior Publication Data

US 2013/0088192 A1   Apr. 11, 2013

(51) Int. Cl.
  *H02J 7/00* (2006.01)
  *H02J 5/00* (2016.01)
  (Continued)

(52) U.S. Cl.
  CPC . *H02J 7/00* (2013.01); *G06F 1/266* (2013.01); *H02J 5/005* (2013.01); *H02J 7/0047* (2013.01); *H02J 7/025* (2013.01); *H04B 5/0031* (2013.01); *H04B 5/0037* (2013.01); *H04B 5/0087* (2013.01); *H02J 7/0004* (2013.01); *H02J 2007/005* (2013.01)

(58) Field of Classification Search
  CPC ..... H02J 7/025; H02J 2007/005; H02J 5/005; H02J 7/00; H02J 7/0004; H02J 7/0047; G06F 1/266; H04B 5/0031; H04B 5/0037; H04B 5/0087
  USPC ................................. 320/108, 137
  See application file for complete search history.

(56) References Cited

U.S. PATENT DOCUMENTS 6,427,074 B1   7/2002   Chavez, Jr. et al.
7,290,034 B2   10/2007   Budd et al.
(Continued)

FOREIGN PATENT DOCUMENTS

EP   1715642 A2   10/2006
EP   2278684 A2   1/2011
EP   2328223 A1   6/2011

OTHER PUBLICATIONS

Extended European Search Report dated Dec. 20, 2011 for European Application No. EP11184014.
(Continued)

*Primary Examiner* — Nathaniel Pelton
(74) *Attorney, Agent, or Firm* — Jose Gutman; Fleit Gibbons Gutman Bongini & Bianco P.L.

(57) ABSTRACT

A power source device and a power charge device interoperate according to a wireless charging protocol. The power source device inductively wirelessly transmits charging energy signal via an inductive wireless power transmitting circuit. The power charge device wirelessly receives the inductively wirelessly transmitted charging energy signal via an inductive wireless power receiving circuit. The power charge device transfers wirelessly received charging energy signal to a re-chargeable battery of the power charge device. In response to determining that the power source device and the power charge device are in a charging arrangement, the power source device controls user access to a lockable user interface based on receiving information from the power charge device and can display messages received by the power charge device from a wireless communication network. The power source device can include a personal computing system and the power charge device can include a mobile phone.

21 Claims, 16 Drawing Sheets

(51) Int. Cl.
*H02J 7/02* (2016.01)
*G06F 1/26* (2006.01)
*H04B 5/00* (2006.01)

(56) References Cited

U.S. PATENT DOCUMENTS

| | | |
|---|---|---|
| 2003/0018581 A1 | 1/2003 | Bratton et al. |
| 2005/0151511 A1 | 7/2005 | Chary |
| 2005/0215233 A1 | 9/2005 | Perera et al. |
| 2006/0184705 A1* | 8/2006 | Nakajima ............... 710/303 |
| 2007/0103110 A1 | 5/2007 | Sagoo |
| 2008/0028239 A1 | 1/2008 | Rapps et al. |
| 2008/0069069 A1 | 3/2008 | Schessel et al. |
| 2008/0166968 A1 | 7/2008 | Tang et al. |
| 2008/0311961 A1 | 12/2008 | Cotevino et al. |
| 2009/0039828 A1 | 2/2009 | Jakubowski |
| 2009/0051312 A1 | 2/2009 | Simon et al. |
| 2009/0096417 A1 | 4/2009 | Idzik et al. |
| 2009/0134837 A1 | 5/2009 | Bersenev |
| 2009/0144575 A1 | 6/2009 | Tevanian, Jr. |
| 2009/0150687 A1 | 6/2009 | Kim et al. |
| 2009/0191925 A1 | 7/2009 | Moseler et al. |
| 2009/0278492 A1* | 11/2009 | Shimizu et al. ............... 320/108 |
| 2009/0312046 A1 | 12/2009 | Clevenger et al. |
| 2010/0036773 A1 | 2/2010 | Bennett |
| 2010/0083012 A1 | 4/2010 | Corbridge et al. |
| 2010/0084918 A1 | 4/2010 | Fells et al. |
| 2010/0109443 A1 | 5/2010 | Cook et al. |
| 2010/0113106 A1 | 5/2010 | Supran |
| 2010/0194335 A1* | 8/2010 | Kirby et al. ................ 320/108 |
| 2010/0277121 A1* | 11/2010 | Hall et al. .................. 320/108 |
| 2011/0014895 A1 | 1/2011 | Fischer et al. |
| 2013/0026981 A1* | 1/2013 | Van Der Lee ............. 320/108 |

OTHER PUBLICATIONS

Partial European Search Report dated Mar. 9, 2012 for European Application No. EP11184012.
Final Office Action dated Aug. 7, 2013 for U.S. Appl. No. 13/253,490.

* cited by examiner

WIRELESS CHARGING AND COMMUNICATION WITH POWER SOURCE DEVICES AND POWER CHARGE DEVICES IN A COMMUNICATION SYSTEM

FIELD OF THE DISCLOSURE

The present disclosure generally relates to a power source device that can wirelessly charge a rechargeable power source of a power charge device, and more particularly to wireless charging of rechargeable power sources of wireless communication devices and contemporaneous wireless communication with such wireless communication devices in a communication system.

BACKGROUND

Many types of portable electronic devices (such as cellular phones, smart phones and some kinds of portable computers, such as tablet computers or laptop computers, as well as some accessories such as some headsets) exchange data, such as audio data, voice data, image data, video data, text messages, and e-mails, and any combination thereof, with messaging servers over long range wireless data communication links in one or more wireless communication networks. Many such devices can communicate (e.g., with another device or base station) without a wired or cabled physical connection, and may be called wireless communication devices. One example of such wireless data communication links includes cellular-like data networks. Wireless communication devices can receive messages from remote servers over a wireless data communication link in a one-way or a two-way wireless communication protocol. Some of these portable electronic devices may be handheld, that is, sized and shaped to be held or carried in a human hand.

Communication devices are becoming so ubiquitous in society that users often own, or have authorized use of, two or more such communication devices. Users with two or more communication devices often receive and send data on all of their communication devices, possibly different devices using different communication links. For example, a user can receive emails on their personal laptop computer, optionally using a wireless modem, and contemporaneously will also receive the same emails on their wireless cellular phone devices. This type of duplicate communication may be deemed unnecessary or duplicative or wasteful of communication system and device resources.

Additionally, mobile wireless communication devices typically use rechargeable power supplies, such as batteries or other electrical charge storage devices, to permit device operation while roaming and without being tethered to a particular stationary power source. As the rechargeable power source, e.g., the battery, in a wireless communication device becomes depleted it can be charged by connecting the device to a stationary power source, such as using a charger that is connected to an AC outlet. This may pose an inconvenience to a user because 1) a user of the device may have to monitor the charge level of the rechargeable power source in the wireless communication device to determine when charging is indicated, and 2) a user may have to make arrangement for and likely carry extra charging paraphernalia, such as charger equipment and power cabling, to be able to charge the wireless communication device as necessary from time to time. Although wireless charging pads may be popular, in part because this type of charger helps reduce the interconnection of power cabling with the wireless communication device, a wireless charging pad may as a practical matter have limited portability, may be comparatively large, and may require access to an AC outlet.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
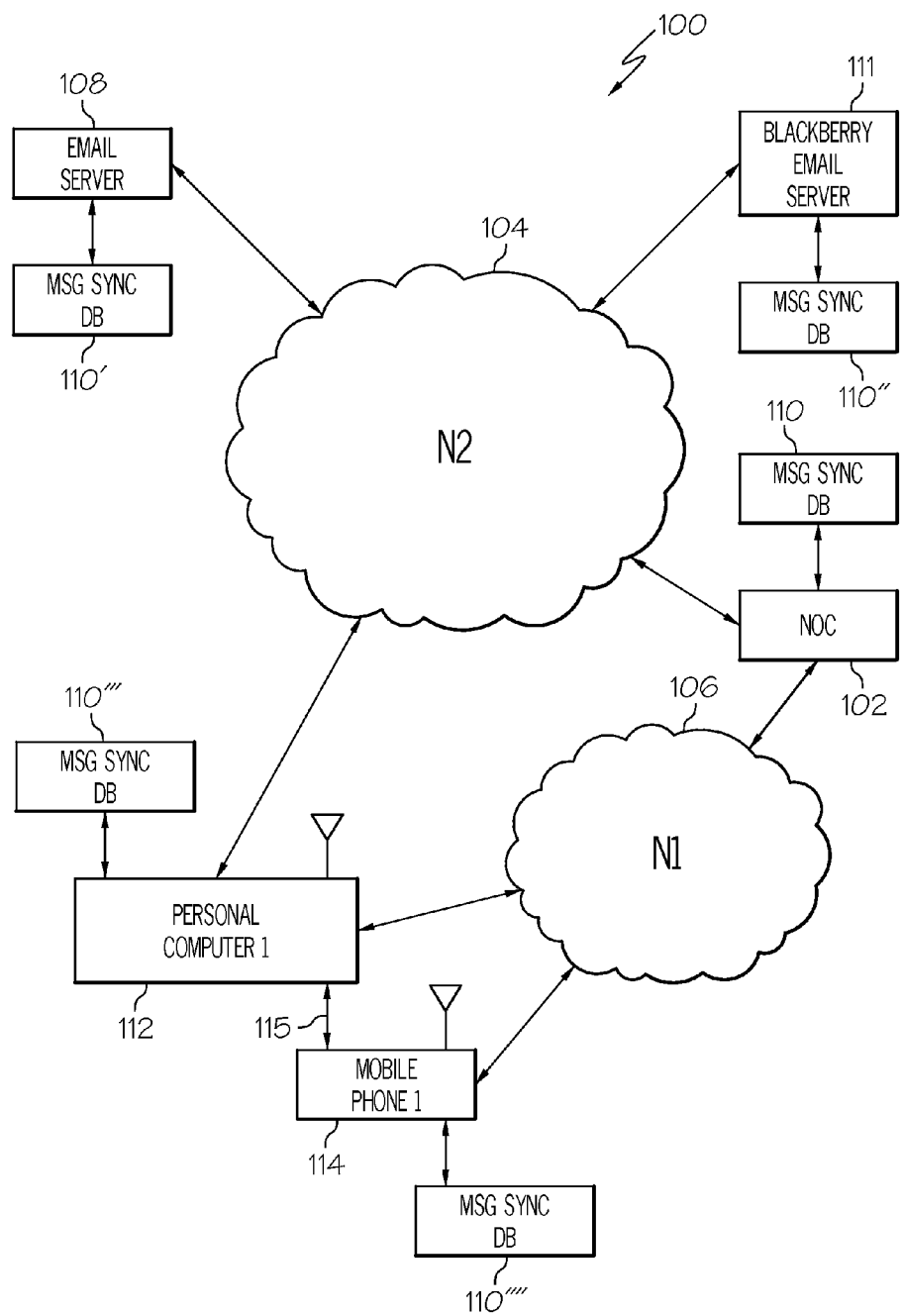
FIG. 1 is a block diagram illustrating a communication system in accordance with one example.

In general, this disclosure is directed to transfer of power between two portable electronic devices, such as two wireless communication devices. A power source device—which supplies power—and a power charge device—which receives power—engage in the transfer of power according to a wireless charging protocol. In a typical operation, the power source device inductively wirelessly transmits charging energy signal via an inductive wireless power transmitting circuit. The power charge device wirelessly receives the inductively wirelessly transmitted charging energy signal via an inductive wireless power receiving circuit. The power charge device transfers wirelessly received charging energy signal to a power storage element, such as a re-chargeable battery. As will be discussed in more detail below, the power source device may control user access to a lockable user interface based on receiving information from the power charge device and can display messages received by the power charge device from a wireless communication network.

As required, detailed embodiments are disclosed herein; however, it is to be understood that the disclosed embodiments are merely examples and that the devices, systems and methods described below can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function. The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a lap top computer, a tablet computing system, a personal digital assistant, a workstation, or the like. A processing system may include one or more processing systems or processors. A processing system can be realized in a centralized fashion in one processing system or in a distributed fashion where different elements are spread across several interconnected processing systems. The term "personal computing system" describes a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network" and "wireless communication network" similarly describe a network that communicatively couples computers and devices primarily or entirely by wireless communication media. The terms "wired network" and "wired communication network" similarly describe a network that communicatively couples computers and devices primarily or entirely by wired communication media.

Various embodiments solve problems discussed above by: 1) maintaining charge on mobile device's battery; 2) utilizing one common display screen to alert users of an incoming message when more than one screen is in proximity to the user; 3) simplifying unlocking of a personal computer when in a charging arrangement with the mobile phone; 4) clearing space on a user's office desk; and 5) expanding application synchronization to both the mobile device and the personal computer. A novel method improves battery life experience by keeping the mobile device fully charged by utilizing an integrated wireless charging system. A wireless charging coil under the skin of a personal computer is capable of transmitting charging energy signal to the mobile phone device. Once the mobile phone and the personal computer are in proximity to each other in a charging arrangement, a synergistic communication protocol is established between the two devices to provide flexibility in what user interface to use for accessing message communication. Text messages and email messages received by the mobile phone can be transferred to the personal computer via short range wireless communication, allowing a user interface in the personal computer to present messaging information to a user. The user interface of the personal computer can be unlocked more effectively, such as for communication of messages between the two devices and the user, based on the lock status of a user interface of the mobile phone. Additionally, the communication system can avoid duplicate email messages being transmitted to the two devices when in a charging arrangement and sharing a single user interface. This helps improve data throughput in the communication system and improves utilization of resources in the two devices. These and more aspects of the disclosure will be discussed in more detail below.

As shown in FIG. 1, a communication system 100, in one example, includes a network operations center (NOC) 102 (also referred to as a server system 102 or a server 102) communicatively coupled with a first network N1 106 and a second network N2 104. In one example, the first network N1 106 comprises at least one wireless communication network and the NOC 102 comprises a server system 102 for managing communications in the first network N1 106. The second network N2 104 comprises a wide area network such as the Internet. The NOC 102 includes one or more information processing systems, memory storage systems, communication interfaces, and administrative and technical personnel user interfaces. The NOC 102, according to the present example, is communicatively coupled to a message synchronization data base system 110. Examples of this message synchronization database system 110, and with various examples of its use in the communication system 100, will be described in more detail below with reference to FIG. 20. The NOC 102, in the present example, communicates with the message synchronization database system 110 and keeps track of communication devices 112, 114, in the communication system 100 that are linked together to communicate information between the devices 112, 114, as will discussed in more detail below.

An email server 108 is communicatively coupled with the second network N2 104. The email server 108, according to one example, comprises one or more general purpose email server systems, such as provided by commercial email systems such as Gmail, hotmail, or any similar type of commercial email server system available to users via Internet communication. This email server 108, according to various examples, may optionally comprise a private email server system such as provided inside a private company email server system, a private government email server system, a private user email server system, and the like.

Optionally, the email server 108 is communicatively coupled with a message synchronization database system 110', which can be similar to the example of the message synchronization database system 110 in the present example being communicatively coupled with the NOC 102, and described in more detail with reference to FIG. 20.

Additionally, a server such as a BlackBerry™ email server 111 is communicatively coupled with the second network N2 104. The BlackBerry email server 111 comprises a proprietary commercial email server system commercially available from Research In Motion, Inc., for use with BlackBerry wireless communication devices.

Optionally, the BlackBerry email server 111 is communicatively coupled with a message synchronization database system 110", which can be similar to the example of the message synchronization database system 110 in the present example being communicatively coupled with the NOC 102, and described in more detail with reference to FIG. 20.

One or more communication devices, such as a personal computer 1 112 and a mobile phone device 1 114 can be communicatively coupled with the wireless communication network N1 106 and the wide area network N2 104 as shown. In this example, the personal computer 1 112 includes a wireless communication interface that communicatively couples the personal computer 1 112 with the wireless communication network N1 106. The personal computer 1 112, can receive messages and send messages via either or both of the networks N1 106, N2 104 in communication with the NOC 102. The mobile phone device 1 114, according to the present example, can wirelessly receive messages and wirelessly send messages via the wireless network N1 106, in communication with the NOC 102. The email server 108, and optionally the BlackBerry email server 111, can receive email messages and send email messages via the network N2 104. The BlackBerry email server 111 can also efficiently transmit email messages, via the NOC 102, to BlackBerry wireless communication devices, such as the mobile phone device 1 114, operating in the wireless network N1 106.

In this example, a wireless communication device comprises a wireless two-way communication device with data communication capabilities and optionally with voice communication capabilities. Such wireless communication devices communicate with a wireless voice or data network using a suitable wireless communication protocol. Wireless voice communications are performed using either an analog or digital wireless communication channel. Data communications allow the wireless communication device to communicate with other computer systems such as via the Internet N2 104. Examples of wireless communication devices that are able to incorporate the above described systems and methods include, without limitation, a data messaging device, a two-way pager, a cellular telephone with data messaging capabilities, a wireless Internet appliance, or a data communication device that may or may not include telephony capabilities.

Optionally, the personal computer 1 112 is communicatively coupled with a message synchronization database system 110''' and/or the mobile phone device 1 114 is communicatively coupled with a message synchronization database system 110'''', which in either case can be similar to the example of the message synchronization database system 110 in the present example being communicatively coupled with the NOC 102, and described in more detail with reference to FIG. 20.

Figure 20:
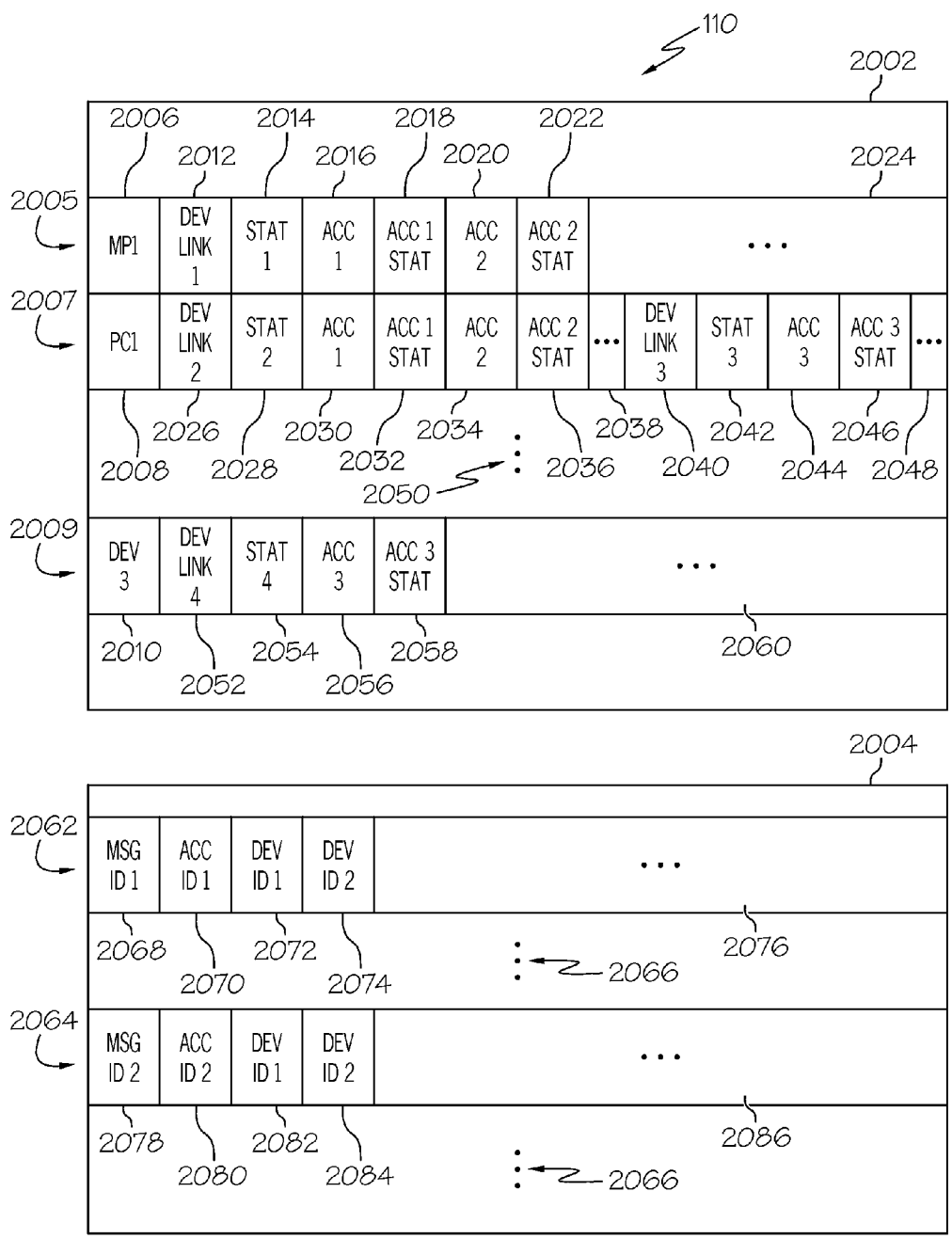
FIG. 20 is a block diagram showing an example of a message synchronization database usable in the communication system of FIG. 1.

With reference to FIG. 20, the message synchronization data base 110, according to the present example, is used by the NOC 102 to keep track of, among other things, communication device messaging status. The message synchronization data base 110, in this example, comprises a communication device status database 2002 and a message status database 2004.

The communication device status database 2002 includes database records 2005, 2007, 2009, 2050, associated with communication devices. A first database record 2005 is associated with the mobile phone 1 114. A second database record 2007 is associated with the PC 1 112. A third database record 2009 is associated with a third communication device (not shown) in the communication system 100. Other database records 2050 are similarly associated with other communication devices (not shown) in the communication system 100.

Each record 2005, 2007, 2009, in the communication device status database 2002, includes a device identification field 2006, 2008, 2010, that identifies the respective communication device associated with the particular record 2005, 2007, 2009. The device identification field 2006, 2008, 2010, according to the present example, includes identification information to uniquely identify the respective communication device in the communication system 100. The identifier information in the identification field 2006, 2008, 2010, may comprise any unique identifier information to identify the particular communication device to the server 102. For example, in the case of a wireless communication device, the identifier information may comprise one or more of an Electronic Serial Number (ESN), a Mobile Equipment Identifier (MEID), an International Mobile Equipment Identity (IMEI), or a Mobile Identification Number (MIN) of a wireless communications device. As a second example, in the case of a communication device in a wide area network such as the Internet N2 104, the identifier information may comprise an internet protocol (IP) address for the device.

Additionally, a device link field 2012, 2026, 2052, uniquely identifies a second separate communication device in the communication system 100 that is in a charging arrangement with the primary device identified by the device identification field 2006, 2008, 2010. The identifier information in the device link field 2012, 2026, 2052, may comprise any unique identifier information to identify the particular communication device to the server 102. For example, in the case of a wireless communication device, the identifier information may comprise one or more of an Electronic Serial Number (ESN), a Mobile Equipment Identifier (MEID), an International Mobile Equipment Identity (IMEI), or a Mobile Identification Number (MIN) of a wireless communications device. As a second example, in the case of a communication device in a wide area network such as the Internet N2 104, the identifier information may comprise an internet protocol (IP) address for the device.

Each record also includes a device status field 2014, 2028, 2054, that indicates the status of a charging arrangement between the primary and the secondary devices associated with the particular record 2005, 2007, 2009. A device status field 2014, 2028, 2054, for example, may indicate a charging arrangement in which the primary and secondary devices are in a loosely coupled charging arrangement. In such a loosely coupled charging arrangement, the two communication devices are capable of transferring a charging signal between each other to charge the primary device by the secondary device, or vice versa, as will be described in more detail below. Secondly, the device status field 2014, 2028, 2054, for example, may indicate that the primary and secondary devices are in a closely coupled charging arrangement, where the two communication devices are capable of transferring a charging signal between each other to charge the primary device by the secondary device, or vice versa, as will be described in more detail below. Thirdly, the device status field 2014, 2028, 2054, may indicate that the primary and secondary devices are in a short range communication mode, where the two communication devices are capable of short range communication with each other. Other device status information may optionally be included with the device status field 2014, 2028, 2054. For example, other types of device status information may include any one, or a combination, of the following: that a charging arrangement has been decoupled (or disconnected) between primary and secondary devices, that a short range communication has been decoupled (or disconnected) between primary and secondary devices, that a primary device status is out-of-network (such as out-of either the first network N1 106 and/or the second network N2 104), that a primary device status is in-network, that a secondary device status is out-of-network, and that a secondary device status is in-network.

Additionally, each data base record 2005, 2007, 2009, in the communication device status data base 2002 may include one or more account identification fields 2016, 2020, 2030, 2034, 2044, 2056, which identify particular account information associated with each communication device that is associated with the particular data base record 2005, 2007, 2009. For example, a first data base record 2005 associated with the mobile phone 1 114 is further associated with a first account identified by account identification information 1 2016 and a second account identified by account identification information 2 2020.

Each of these accounts is also associated in the particular data base record 2005 with respective account status information 2018, 2022. This account identification information 2016, 2020, and account status information 2018, 2022, indicates that the mobile phone 1 device 114 and the device (for example, the PC 1 112) identified by the device link 1 information 2012, have association with each other and with the first account 2016 and the second account 2020. For each particular data base record 2005, 2007, the account identification information 2016, 2020, and the associated account status information 2018, 2022, can be used to indicate how messages for each particular account are being sent to each of the primary and secondary communication devices 114, 112, associated with the particular data base record 2005, 2007.

With respect to the data base record 2007 associated with the PC 1 device 112, there are multiple secondary devices that are linked with the primary communication device, i.e., with the PC1 112. A secondary communication device identified by the device link 2 2026 is linked with the primary device PC1 112 that is identified by the primary device ID 2008. For example, this device link 2 2026 may identify the mobile phone 1 114. However, another secondary device (not shown) identified by the device link 3 2040 is also associated or linked with the PC1 device 112. This other secondary device (not shown) is identified by device link 3 2040 with a status 3 2042 and additionally an account 3 2044 and an account 3 status 2046 being shared with the primary device PC1 112. Other secondary communication devices (not shown) may be identified in the particular data base record 2007, as indicated by the open field information 2038. Furthermore, other information may be stored in the respective data base records 2005, 2007, 2009, such as indicated by the respective open field 2024, 2048, 2060.

As shown in FIG. 20, in the current example the message synchronization data base 110 comprises a message status data base 2004. This message status data base 2004 includes message identification records 2062, 2064, 2066, which identify particular messages that are being communicated with the communication devices identified in the communication device status data base 2002. Each message status data base record 2062, 2064, 2066, includes a message identification field 2068, 2078 that uniquely identifies a particular message. Also, each message status data base record 2062, 2064, includes account identification information 2070, 2080, that identifies an account associated with the particular message identified by the respective message identification field 2068, 2078. Each message status data base record 2062, 2064, further includes device identification information 2072, 2074, 2082, 2084, that identifies one or more communication devices communicating the respective message associated with the particular account 2070, 2080. Other message status information and related information 2076, 2086, can be stored with the message status data base records 2062, 2064, as shown in FIG. 20. In this way, one or more messages being delivered in the communication system 100 to one or more communication devices 112, 114, are tracked in the message status data base 2004, and associated with communication devices that have records 2005, 2007, 2009, 2050, that are being tracked in the communication device status data base 2002. Various ways of utilizing the information in the message synchronization data base 110 will be discussed in more detail below.

In the present example, the message synchronization data base 110 is utilized by the NOC 102 to track and monitor messages being communicated in the communication system 100 to communication devices 112, 114. As shown in FIG. 1, according to various embodiments, a message synchronization data base 110, 110', 110", 110''', and 110'''', may be communicatively coupled with various other components of the communication system 100, as shown in FIG.1. For example, the email server 108 may be communicatively coupled with a message synchronization data base 110' such that the email server 108 keeps track of email messages being delivered from the email server 108 to communication devices 112, 114 in the communication system 100. As another example, a BlackBerry email server 111 is communicatively coupled with a message synchronization data base 110" for tracking messages delivered from the BlackBerry email server 111 to communication devices 112, 114 in the communication system 100.

In certain embodiments, one or more of the communication devices 112, 114, may be communicatively coupled with a respective message synchronization data base 110''', 110'''', such that the particular communication device 112, 114, may keep track of messages being delivered to the one or more communication devices 112, 114. According to various embodiments, one or more components 102, 108, 111, 112, 114, of the communication system 100 may be communicatively coupled with one or more message synchronization data bases as shown in FIG.1. Various examples of how one or more of these components 102, 108, 111, 112, 114, of the communication system 100 can utilize message synchronization data base 110, 110', 110", 110''', and 110'''', will be discussed in more detail below.

Figure 2:
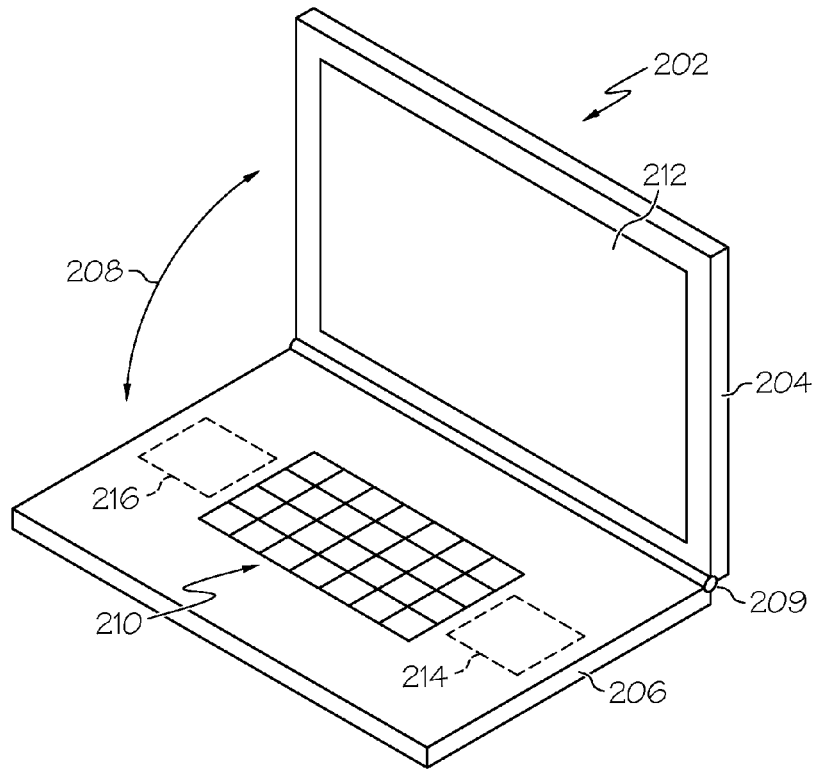
FIG. 2 is a block diagram illustrating a communication device according to one example illustrating an open lap top personal computer.
Figure 3:
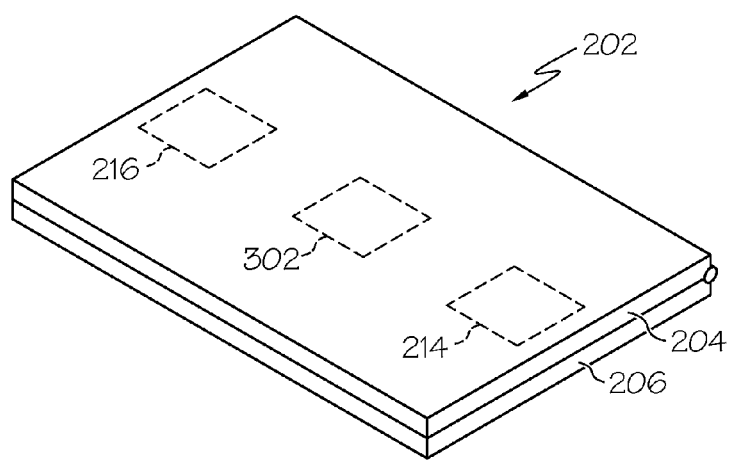
FIG. 3 is another view of the communication device of FIG. 2, illustrating a closed lap top personal computer.

FIG. 2 illustrates a lap top personal computer 202, which is an example of the personal computer 1 112 shown in FIG. 1. The lap top 202 includes a hinged lid 204 that can be rotated 208 via a hinged mechanism 209. The lid portion 204 can be rotated 208 about the hinge mechanism 209 to a base portion 206 which closes the lap top 202, as shown in FIG. 3. When the lid portion 204 is rotated 208 away from the base portion 206 it opens the lap top for normal use by a user. The base portion 206 includes a keyboard 210 and other user input interface elements. Such other elements may include a track pad, joy stick, track ball, key pad, and other user input interfaces that are known to those of ordinary skill in the art. The lid portion 204 includes a graphic display 212 for presenting visual information to the user of the lap top device 202. Strategically located under the outer skin of the lap top 202, in this example, are located three separate inductive coils 214, 216, 302, that can be used as battery chargers for other devices with re-chargeable batteries, such as the mobile phone 1 device 114 shown in FIG. 1. As illustrated in FIGS. 2 and 3, there are two coils 214, 216, located just under the skin in the base portion 206 of the lap top 202. A third coil 302 is located just under the outer skin of the lid portion 204. These coils 214, 216, 302, can be used for inductive coupling of charging energy signals between the lap top device 202 and another device, such as the mobile phone 1 114, for charging the re-chargeable battery of the other device.

Figure 4:
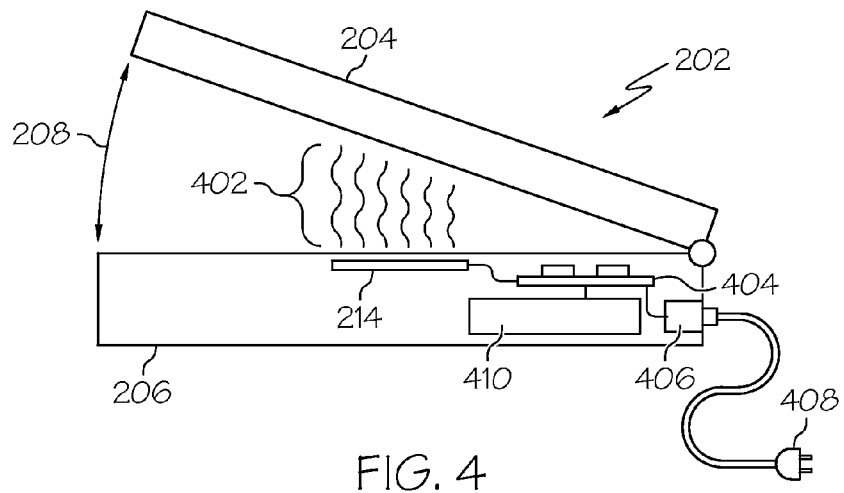
FIG. 4 is another view of the communication device of FIG. 2, illustrating various internal components of the lap top personal computer.

FIG. 4 illustrates one of the coils, in this case, the right coil 214 in the base portion 206 of the lap top 202. Note that inductive charging energy transfer 402 is possible with the lap top 202 in either the open position or closed position such as shown in FIGS. 2 and 3. In the closed position such as shown in FIG. 3, the inductive coupling of charging energy 402 can be transmitted through the lid portion 204 to a receiving device that is located in proximity to the right most coil 214. As shown in FIG. 4, charging control and generation circuits 404 are coupled with the coil 214 to generate the inductive coupling of charging energy 402, as will be discussed in more detail below. The lap top personal computer 202 includes a re-chargeable battery 410 as a power source for the lap top 202. Additionally, the lap top 202 includes an AC interface 406 that can be electrically coupled via cable and adaptor 408 with an AC outlet to provide AC power to the lap top 202. AC power can be used by the lap top 202 with the charging and control circuits 404 to deliver inductive coupling charging energy 402 to another device. AC power can be used by the lap top 202 to charge its re-chargeable battery 410. Lastly, the lap top 202 can utilize power from its re-chargeable battery 410 to provide inductive coupling charging energy 402 to another device. These features and functions for inductive coupling of charging energy will be discussed in more detail below.

Figure 5:
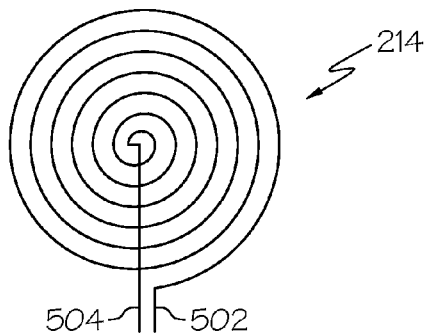
FIG. 5 is a planar view of an example of an inductive coupling coil that is suitable for use in a communication device, such as the communication device shown in FIGS. 2, 3, and 4.

FIG. 5 illustrates one example of a coil 214 which is suitable for use in inductive coupling of charging energy 402. This coil 214 includes two leads 502, 504 for electrically coupling charging energy via the coil 214. In one example, the coil 214 comprises an air cored coil. Other types of cores may be used with the coil 214 in alternative embodiments.

Resonant inductive coupling of charging energy comprises near field wireless transmission of energy between two coils that are resonant to a charging energy signal at the same frequency. A transmit coil, such as coil 214 shown in FIG. 5 operates in a tuned L-C circuit that causes the coil to ring with an oscillating current at the resonant frequency. This generates oscillating magnetic field from the coil 214. A complimentary second coil is located in the other device, such as the mobile phone 1 device 114 and is used as a receiver coil. The receiver coil is in a similar tuned L-C circuit to the tuned L-C circuit of the transmit coil 214 and resonates at the same frequency. When the second coil is brought in proximity to the first coil, the second coil (receiver coil) picks up charging energy signal transmitted from the first coil (transmit coil) 214 at about the resonant frequency of both coils and respective tuned L-C circuits. The oscillating magnetic field, communicating the charging energy signal between the transmit coil and the receiver coil, operates to inductively transfer charging energy signal between the coils at the resonant frequency. This resonant transfer of charging energy is a near field transmission between the two coils which radiates very little energy from the transmit coil to other non-resonant structures in proximity to the coils. Hence, this can be a very efficient means of transmission of charging energy between devices.

Figure 6:
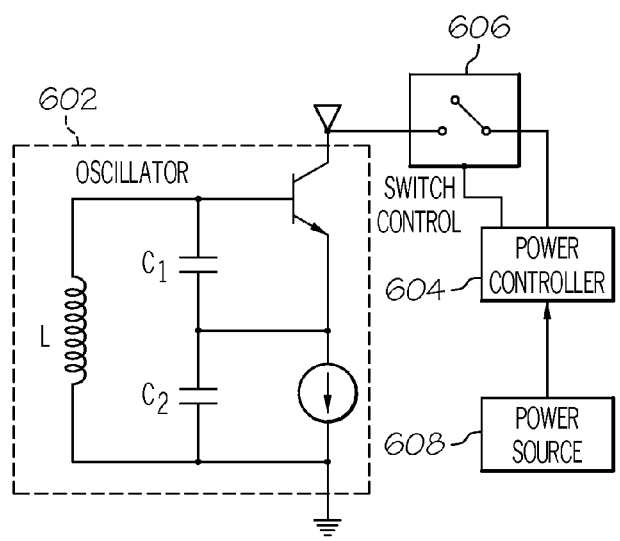
FIG. 6 is a circuit block diagram illustrating a power sourcing induction coil circuit and controller, in accordance with one example.

FIG. 6 illustrates one example of a resonant inductive coupling circuit for transmitting charging energy via a transmit coil. A Colpitts oscillator circuit 602, for example, can be used as a tuned L-C oscillator that rings the transmit coil with charging current at the pass band about the resonant frequency. The pass band can be selected for the oscillator 602 either by static circuit design of an oscillator circuit, or, in an alternative embodiment, by using tunable electrical components, such as a tuning capacitor or a tuning inductor or both, that can change the tuned pass band resonant frequency for the oscillator 602. The oscillator 602 is controlled by a power controller circuit 604 and a controlled power switch 606. In one example, the power controller 604 controls transfer of energy from a power source 608 via the controlled switch 606 to the oscillator 602. The power controller 604 controls the switch 606 to open and close the switch 606 according to an ON-OFF pattern. In this way, the power controller 604 can modulate a charging energy signal that is inductively transferred to another device via the transmit coil and the L-C tuned circuit of the oscillator 602.

Figure 7:
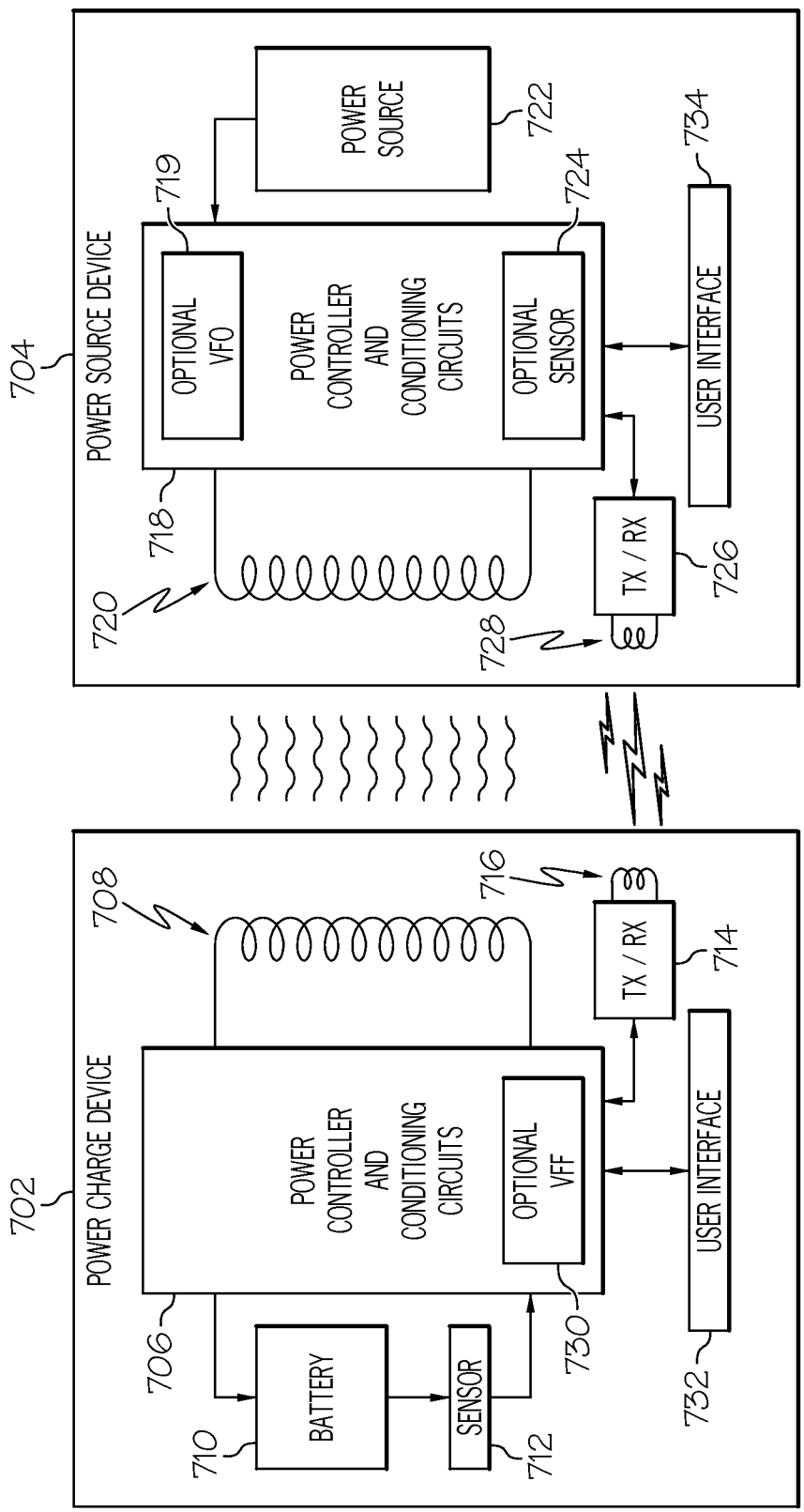
FIG. 7 is a block diagram illustrating a power sourcing device and a separate power charging device interoperating to provide a charge to a re-chargeable power source associated with the power charging device, in accordance with one example.

FIG. 7 illustrates an example of an inductive coupling of charging energy signal between two devices. A power charge device 702 includes a receiver coil 708 that receives inductively coupled charging energy that is transmitted from transmit coil 720 of the power source device 704. The power charge device 702, for example, may comprise a mobile phone such as the mobile phone 1 114 shown in FIG. 1. The power source device 704, for example, may comprise a lap top personal computer such as the personal computer 1 112 shown in FIG. 1. The power charge device 702 includes a power controller and conditioning circuits 706 that are electrically coupled with a receiver coil 708. The power conditioning circuits electrically couple to the receiver coil 708 to provide a tuned L-C circuit that receives the charging energy signal via the receiver coil 708 at the pass band resonant frequency of the tuned L-C circuit. Optionally, a variable frequency filter 730 is provided with the conditioning circuits and the receiver coil 708 such that the resonant frequency of the receiver coil 708 and the tuned L-C circuit can be varied by a controller. That is, the resonant frequency can be tuned to a particular resonant frequency pass band for reception of inductively transmitted charging energy signal about a pass band at the resonant frequency.

A power source 710, in this example, comprises a re-chargeable battery that can be charged via the inductive coupling of charging energy signal via the receiver coil 708. A sensor circuit 712 is electrically coupled to the re-chargeable battery 710 and provides a sensed charge level indication signal to the power controller 706. The power controller 706 utilizing the sensor 712 can monitor the charge level of the battery 710.

A short range wireless communication transceiver 714 provides a wireless communication interface for the power charge device 702. It should be noted that according to various embodiments alternatives to the short range wireless communication transceiver 714 may include a short range wireless communication transmitter, a short range wireless communication receiver, or both. In one example, the short range wireless communication transceiver 714 includes a coil 716 for facilitating the wireless communication of short range signals between the power charge device 702 and the power source device 704. A user interface 732 is communicatively coupled with the power controller 706 to allow a user of the power charge device 702 to interact with the device 702. The power source device 704 includes a power controller and conditioning circuits 718 electrically coupled with the transmit coil 720. The conditioning circuits 718 are electrically coupled with the transmit coil 720 in a tuned L-C circuit that facilitates transmitting, via inductive coupling, a charging energy signal at the pass band resonant frequency of the tuned L-C circuit. Optionally, a variable frequency oscillator 719 is provided as part of the tuned L-C circuit such that the pass band resonant frequency can be adjusted by the power controller 718. The power controller and conditioning circuits 718 are electrically coupled to the power source 722 which is utilized by the power controller 718 to generate the charging energy signal that is inductively transmitted from the transmit coil 720 at the pass band resonant frequency of the tuned L-C circuit. Optionally, a sensor 724 monitors the charging status of the power source 722 at the power source device 704. Additionally, the sensor 724 can provide an indication of level of a charge energy signal to the power controller 718. In this way, the power controller 718 can monitor the charge level of the power source 722, in this example the re-chargeable battery 722.

A short range wireless communication transceiver 726 is communicatively coupled with the power controller 718. It should be noted that according to various embodiments alternatives to the short range wireless communication transceiver 726 may include a short range wireless communication transmitter, a short range wireless communication receiver, or both. According to one embodiment, the short range wireless communication transceiver 726 includes a coil 728 that facilitates short range wireless communication of signals between the power source device 704 and the power charge device 702. A user interface 734 is coupled to the power controller 718 to facilitate a user interacting with the power source device 704.

In accordance with one example, a power source device inductively couples charging energy signal to a power charge device. The power source device comprises a power source; an inductive wireless power transmitting circuit having a pass band about a resonant frequency, electrically coupled with the power source, for selectively transferring charging energy from the power source to the inductive wireless power transmitting circuit and thereby wirelessly inductively transmitting a charging energy signal having a frequency substantially within the pass band about the resonant frequency; and a charging power processor, communicatively coupled with the inductive wireless power transmitting circuit. The charging power processor, in this example, is configured to: control the inductive wireless power transmitting circuit, based on determining that the power source device is in a charging arrangement with another device, to transfer charging energy signal from the power source to the inductive wireless power transmitting circuit and thereby wirelessly inductively transmitting the charging energy signal to the other device.

Figure 8:
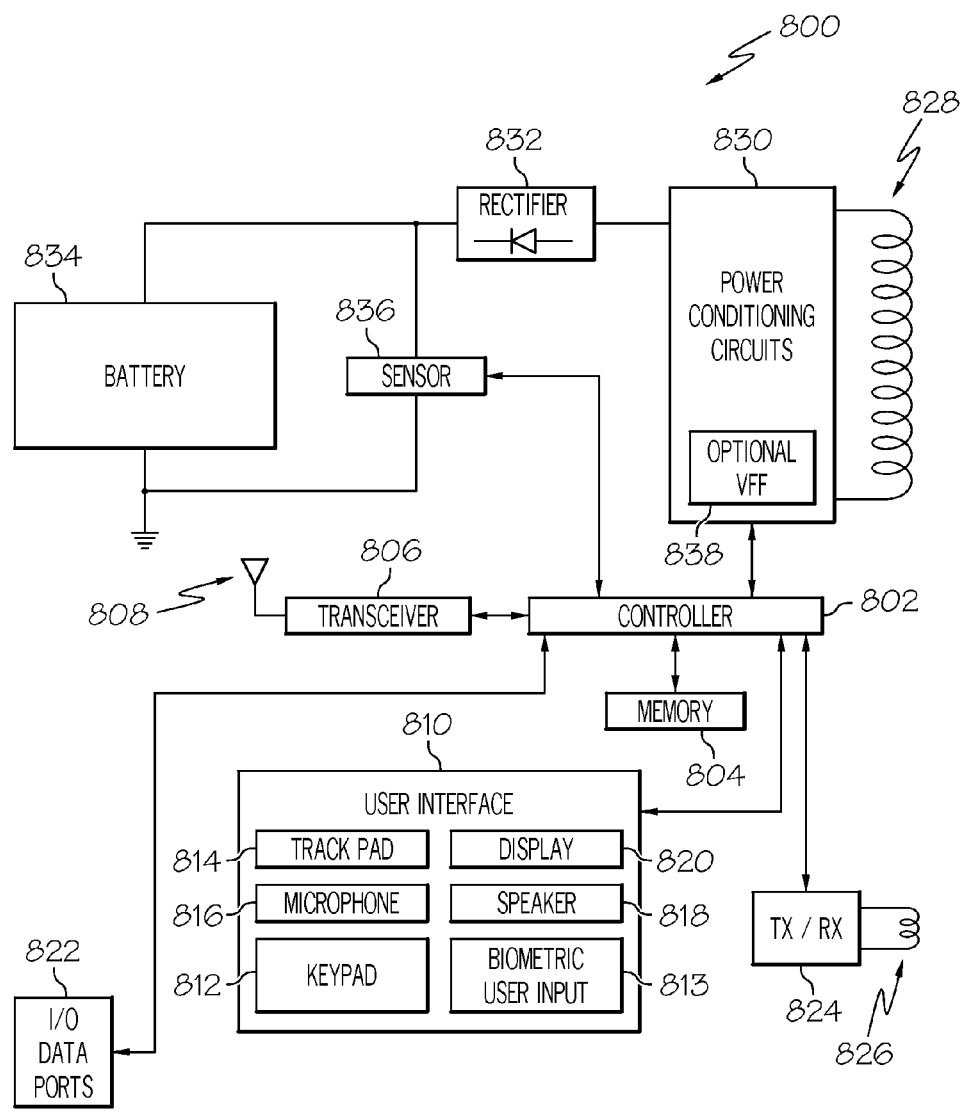
FIG. 8 is a block diagram illustrating a more detailed view of the power charging device of FIG. 7, in accordance with one example.

FIG. 8 shows a detailed circuit block diagram of a power charge device 800, such as the power charge device 702 shown in FIG. 7 and the mobile phone 1 114 shown in FIG. 1. A controller 802 is communicatively coupled to memory 804, such as such flash memory or random access memory (RAM), in the power charge device 800. A wireless communication transceiver 806 (i.e., a long range wireless communication transceiver) is coupled to the controller 802 and to at least one antenna 808 and facilitates long range wireless communication between the mobile phone 1 114 and the wireless communication network 106 as shown in FIG. 1. The controller 802, in this example, includes at least one digital signal processor (DSP) that performs processing to extract data from received wireless signals and to generate signals to be transmitted.

A short range wireless communication transceiver 824 is electrically coupled to a coil 826 and to the controller 802 and provides a short range wireless communication interface for the power charge device 800. It should be noted that according to various embodiments alternatives to the short range wireless communication transceiver 824 may include a short range wireless communication transmitter, a short range wireless communication receiver, or both. As similarly discussed with reference to FIG. 7, the short range wireless communication transceiver 824 with the coil 826 can be used for short range wireless communication of information signals between a power source device 704 and a power charge device 702.

The controller 802 is coupled to one or more Input-Output data ports 822 that allowed data communication via the ports 822 with other devices. Optionally, a variable frequency filter (VFF) 838 is included in the power conditioning circuits 830 and controlled by the controller 802 to adjust a pass band resonant frequency of a tuned L-C circuit that includes the receiver coil 828. In this way, the controller 802 can adjust the resonant frequency pass band of the receiver circuit that includes the receiver coil 828 for receiving charging energy signal at the tuned resonant frequency.

A rectifier circuit 832 is coupled with the power conditioning circuits 830 and provides a rectified charging energy signal to the battery 834 for charging the battery 834. The sensor 836 is used by the controller 802 to provide an indication of level of the charging energy signal to the controller 802. The sensor 836 alternatively is used by the controller 802 to monitor the charge level of the battery 834. The sensor 836 therefore can provide a charge indication information signal to the controller 802 that represents either a charge level of the battery 834 or a level of the charging energy signal wirelessly received from the power source device 704. The controller 802 for the power charge device 800 and the controller 718 for the power source device 704 can use the charge indication information signal in various useful ways. For example, the controller 802 can present charge indication information to a user of the device 800 via the user interface 810.

In one embodiment, the controller 802 can provide the charge indication information to the power source device 704. For example, the power source device 704, in response to receiving the charge indication information, such as via the short range wireless communication transceiver 824 at the power charge device 800 and the short range wireless communication transceiver 726 at the power source device 704, can present the information to a user of the power source device 704 via the user interface 734 of the power source device 704. In this embodiment, the controller 802 uses the short range wireless communication transceiver 824 to wirelessly transmit a representation of the charge indication information to the short range wireless communication transceiver 726 of the power source device 704. The controller 718 of the power source device receives the representation of the charge indication information and presents charge indication information to a user of the power source device 704 via the user interface 734. The charge indication information can represent either a charge level of the battery 834 or a level of the charging energy signal wirelessly received from the power source device 704. For example, a representation of the charge indication information can be displayed on a display screen 212 (see FIG. 2) as a visual representation or a visual indicator or both. Also, see discussion with respect to FIG. 13. Of course, the charge indication information can be used by the controller 802 of the power charge device 800, by the controller 718 of the power source device 704, or by both controllers 802, 718, in various other ways. In one embodiment, the charge indication information can be used by the respective controller 802, 718, of each of the devices 800, 704, to determine whether the devices 800, 704, are operating in a charging arrangement with each other.

The user interface 810 of the power charge device 800 may include user input interface elements and user output interface elements as shown in FIG. 8. For example, a track pad 814 (which in one example may include a track ball) can provide a navigational tool for a user to navigate a cursor on a display 820, and can accept user input from the user of the power charge device 800. The track pad 814 can be used to navigate a cursor, for example, via a graphical user display 820. The track pad 814 can also include a depressible switch mechanism such that a user of the device 800 can press on a portion of the track pad 814 to actuate the track pad 814 and optionally make a selection of a particular function of the device 800. The display 820 may be any type of display, for example, and not for limitation, a graphical display 820.

A microphone 816 receives audio from the ambient environment around the microphone 816. It can also accept voice audio from a user of the device 800. In the case when the device 800 comprises a mobile phone (or a Smartphone), the microphone 816 can be used as part of a mouth piece of a phone for a user to speak into.

A keypad 812 can include buttons that can be depressed by a user of the device 800 to enter information into the device 800. In one embodiment, a keypad 812 may be deployed in combination with a display 820 as a touch screen keypad 812.

A biometric user input 813 captures information from a user of the device 800 to identify the user by their biometric information. For example, a user's fingerprint information may be captured by the biometric user input device 813. As an alternative, the biometric user input device 813 may operate in combination with the microphone 816 to capture the user's voice (or attributes of the user's voice) and thereby identify the user of the device 800. Other forms of biometric user input devices may be implemented in the power charge device 800 as should be understood by those of ordinary skill in the art.

Input-Output data ports 822 are communicatively coupled with the controller 802 and provide interface options between the power charge device 800 and other devices. For example, a USB interface may include one or more Input-Output data ports 822 that allow communication of information between the power charge device 800 and a personal computer (such as the personal computer 1 112 shown in FIG. 1).

According to one example, a wireless communication device comprises a re-chargeable power source; an inductive wireless power receiving circuit having a pass band about a resonant frequency, electrically coupled with the re-chargeable power source, for wirelessly receiving an inductively transmitted charging energy signal having a frequency substantially within the pass band about the resonant frequency and selectively transferring charging energy from the received charging energy signal to the re-chargeable power source; a charging power processor, communicatively coupled with the inductive wireless power receiving circuit. The charging power processor, according to the example, is configured to: control the inductive wireless power receiving circuit, based on determining that the wireless communication device is in a charging arrangement with a power source device, to transfer charging energy from the received charging energy signal to the re-chargeable power source.

Figure 9:
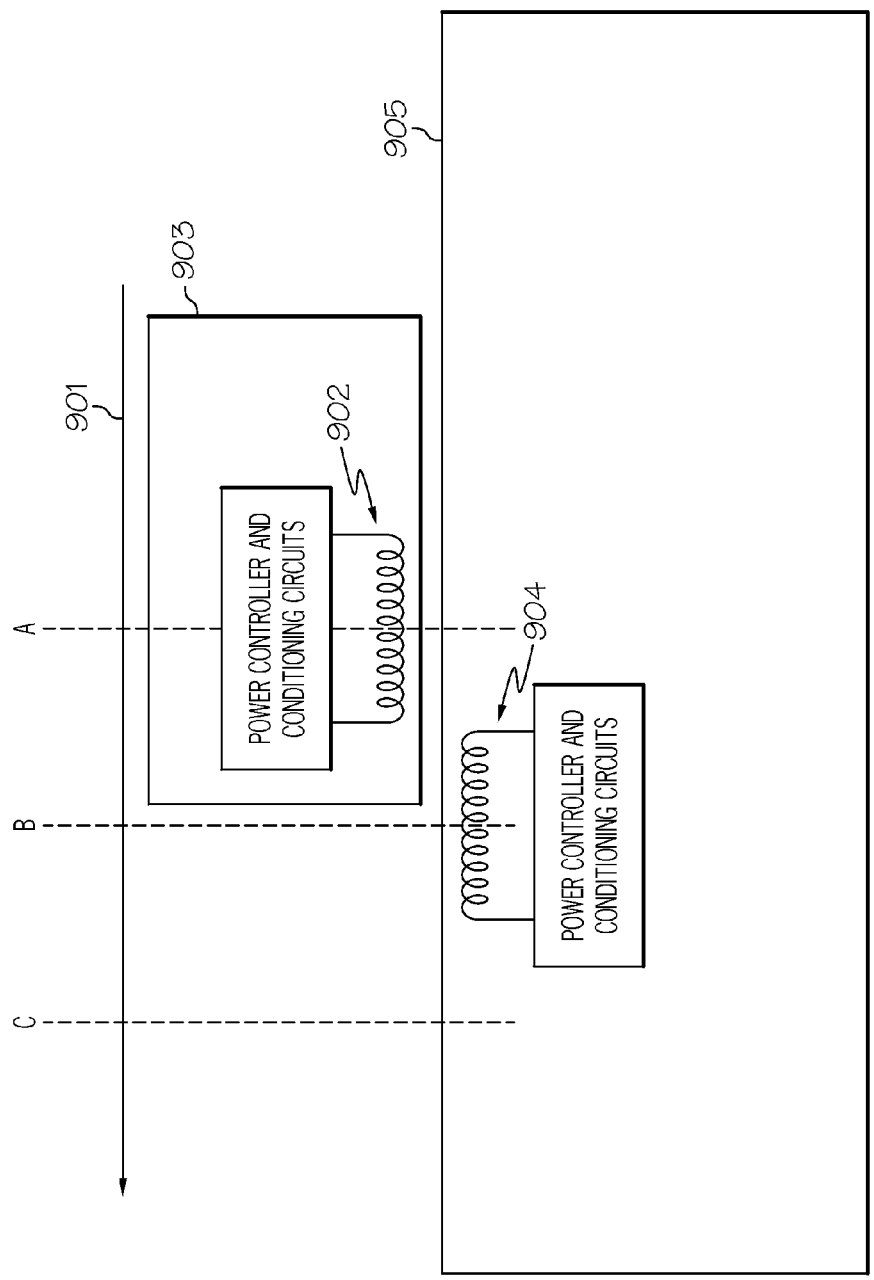
FIG. 9 is a block diagram illustrating a power sourcing device and a separate power charging device in proximity with each other and movable relative to each other, according to one example.
Figure 10:
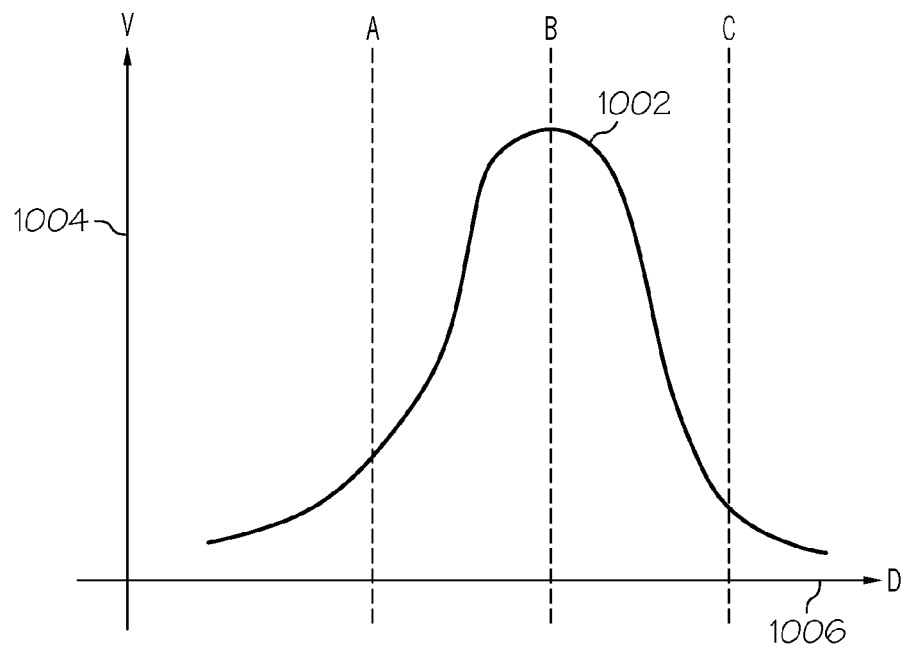
FIG. 10 is a graph diagram illustrating a relationship between voltage of a charging energy signal and relative distance moved by the two devices shown in FIG. 9, in accordance with one example.

With reference to FIGS. 9 and 10, relative motion (as indicated by the arrow 901) between a power charge device 903 (such as the mobile phone 1 114) and a power source device 905 (such as the personal computer 1 112) is shown. The receiver coil 902 of the power charge device 903 moves relative to the transmitter coil 904 of the power source device 905, with three relative locations indicated by the letters A, B, and C. As the 2 coils 902, 904, move relative to each other, FIG. 10 shows a chart of a charging energy signal 102 being received by the power charge device 903 at the three relative locations A, B, and C. The chart in FIG. 10 shows a plot of voltage 1004 of the charging energy signal 1002 as it varies over distance 1006 traveled in relative motion between the receiver coil 902 and the transmitter coil 904. The inductive coupling of a charging signal between the coils 902, 904, varies depending on the distance and relative orientation between the two coils 902, 904.

The transmit coil 904 creates an oscillating magnetic field that the receiver coil 902 will cut through and inductively absorb energy at the various relative locations A, B, and C. As the receiver coil 902 passes through the magnetic field created by the transmitter coil 904 charging energy signal is inductively transferred between the power source device 905 and the power charge device 903. The flux of the magnetic field created by the oscillating energy charged signal at the transmitter coil 904 is experienced by the receiver coil 902 at the various relative positions A, B and C.

At positions A and C the two coils 902, 904, are considered loosely coupled in that they are somewhat distant from each other such that a small fraction of the magnetic flux from the transmitter coil 904 is experienced by the receiver coil 902. At relative position B, the two coils are considered to be tightly coupled (or critically coupled) in that the inductive transfer of charging energy signal at the resonant frequency is relatively high.

It should be noted that the controller 802 (as shown in FIG. 8) can monitor the voltage of the inductively transferred charging energy signal utilizing the sensor 836. As the two devices 903, 905 move relative to each other, such that the two coils 902, 904 also move relative to each other as shown, the controller 802 can capture a charge indication signal (such as a voltage value 1004) from the sensor 836 at relative positions A, B, and C. The controller 802 can store the several values of the charge indication signal (as captured from the sensor 836) in the memory 804 to create a representation of the curve 1002 as shown in FIG. 10.

The charge indication signal values stored in the memory 804 can be presented to a user of the power charge device 800 to inform the user when the relative position of the two devices 903, 905 (and the coils 902, 904) is in a tightly coupled inductive energy transfer arrangement, such as indicated by position B in FIG. 10.

The charge indication signal values stored in the memory 804 can be presented to a user of the power charge device 800 to inform the user when the relative position of the two devices 903, 905 is in a loosely coupled inductive energy transfer arrangement, such as indicated by positions A and C.

This information, i.e., indicating whether the devices 903, 905, are in a range between a tightly coupled arrangement to a loosely coupled arrangement, can be presented to a user, in one embodiment, via audible signals emitted from the speaker 818. The amplitude and/or frequency of these audible signals can guide the user, for example, as the user moves the mobile phone 1 114 relative to the lap top personal computer 112, to assist in the user locating the two devices 112, 114, in a tightly coupled inductive energy transfer arrangement.

This information, i.e., indicating whether the devices 903, 905, are in a range between a tightly coupled arrangement to a loosely coupled arrangement, can be presented to a user, in one embodiment, via a display 820. The display 820 can show information in text or numerical form or in graphical form. Additionally, a combination of forms of information, e.g., any one or a combination of audible, visual text, visual numbers, or graphical, can be presented to the user.

Figures 11A, 11B, 11C:
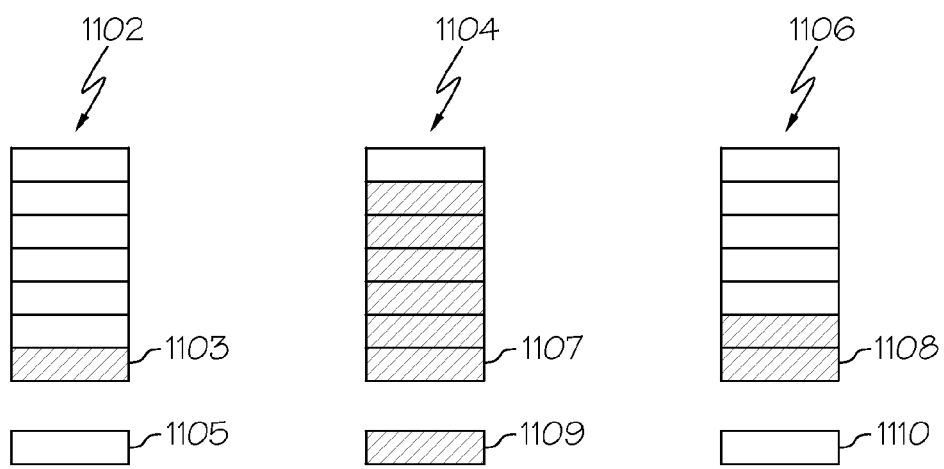
FIG. 11 is a block diagram showing various views of a user interface display, according to one example.

For example, as shown in FIG. 11, a vertical bar graph can be used to indicate to a user that the relative location of the two device 903, 905 is in a range between a tightly coupled inductive energy transfer mode such as in position B, or in a loosely coupled inductive energy transfer mode such as in positions A and C. In position B, as shown in FIG. 11, six bars 1107 out of a total of seven bars in a bar graph 1104 indicates that the energy transfer is relatively high indicating that the two devices 903, 905 are in a tightly coupled inductive energy transfer mode. Additionally, a separate indicator 1109 can be turned ON (highlighted) or even changed to a particular color such as the color green to indicate to a user of the power charge device that the two devices 903, 905 are in a tightly coupled inductive energy transfer mode.

In position A, the bar graph 1102 has only one bar 1103 turned ON (highlighted) thereby indicating a loosely coupled inductive energy transfer mode. The indicator 1105 is turned OFF to indicate to the user that the two devices 903, 905 are in a loosely coupled inductive energy transfer mode. Optionally, the indicator 1105 can be set to a color such as the color red. In similar fashion, at location C, the bar graph indicator 1106 has only two bars 1108 turned ON (highlighted) and the separate indicator 1110 is turned OFF (or colored red) to indicate to the user that the devices 903, 905 are in a loosely coupled inductive energy transfer mode.

As shown in FIG. 3, for example, if the power charge device 903 (such as the mobile phone 1 114 shown in FIG. 1) is located at one of the target charging locations such as shown by the dashed rectangular lines 214, 216, 302, a user of the mobile phone 1 device 114 can advantageously move the mobile phone 1 device 114 over the surface of the lap top 202 while monitoring the display 820 on the mobile phone 1 114 indicating the approximate level of inductive coupling of a charge energy signal between the devices 202, 114. In this way, the user can move the mobile phone 1 device 114 over the outer surface of the lap top 202 to be located approximately over, for example, the target area 214 (shown in FIG. 3) that is just above the coil 214 (shown in FIG. 4). This location of the two devices 202, 114, would represent a tightly coupled inductive energy transfer arrangement between the two devices 114, 202. The user would be guided by the bar graph indicator 1102, 1104, and 1106, to locate the mobile phone 1 device 114 just over the coil 214 in a tightly coupled inductive energy transfer arrangement.

This feature presents to the user a representation of information corresponding to a charge energy signal, such as a bar graph, a visual indicator, an audible indicator, or any combination thereof, to guide the user while moving the mobile phone 1 device 114 over the outer surface of the lap top 202. According to one example, this feature can visually present the bar graph and indicator information on the display 820 of the mobile phone 1 device 114. According to another embodiment, the bar graph and indicator information is presented on the display screen 212 of the lap top 202. In this case, the controller 802 of the mobile phone 1 device 114 uses the short range wireless communication transceiver 824 with the coil 826 to communicate the charge indication signal values from the memory 804 to the controller 718 of the lap top 202 via the short range communication transceiver 726 with the coil 728. The controller 718 of the lap top 202 then presents the bar graph and indicator information on the display screen 212 of the lap top 202. Of course, both the display 820 of the mobile phone 1 device 114 and the display screen 212 of the lap top 202 could contemporaneously present the bar graph and indicator information to guide the user to locate the two devices 114, 202, relative to each other in a tightly coupled inductive energy transfer arrangement.

Figure 12:
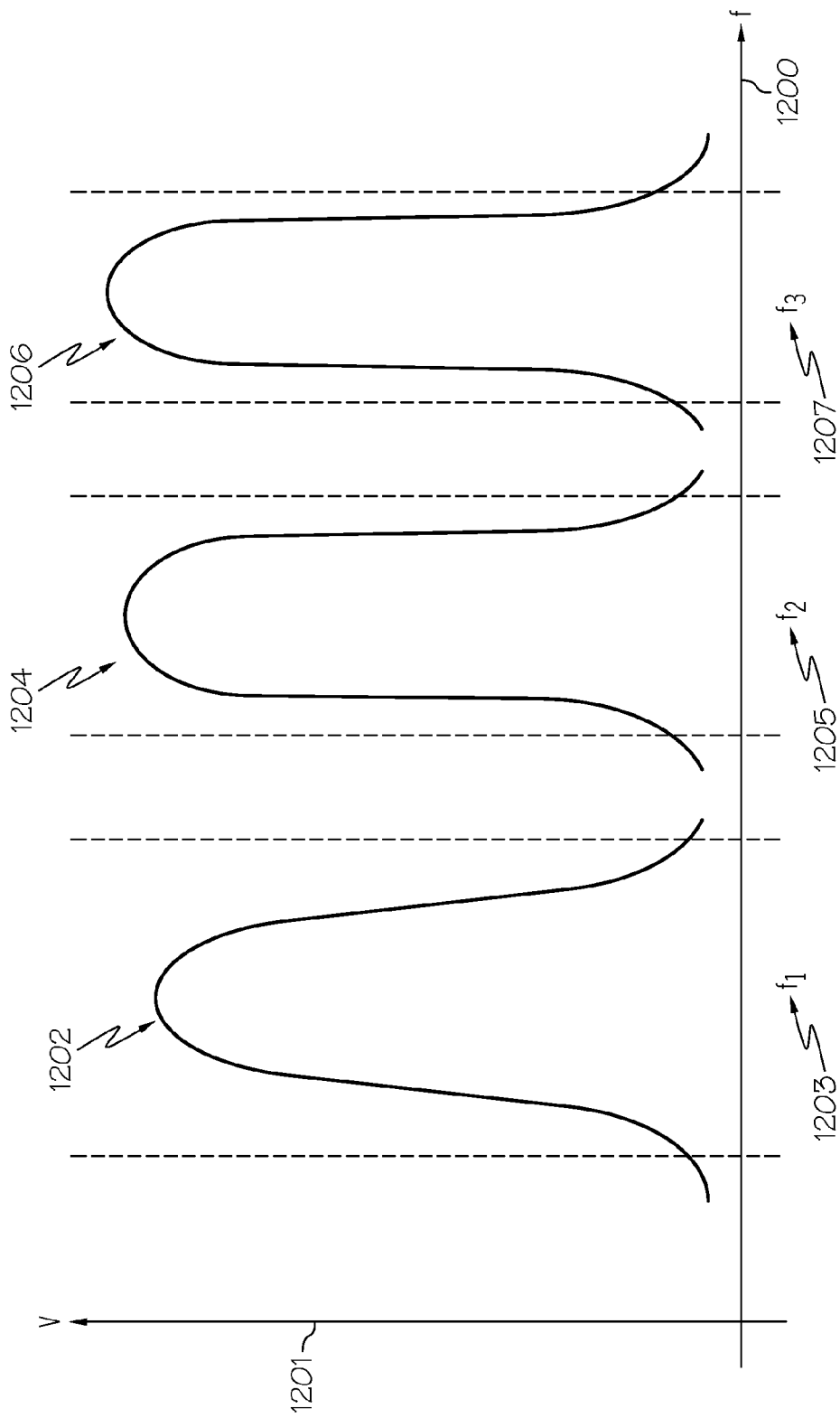
FIG. 12 is a graph diagram illustrating a relationship between voltage of charging energy signal and charging energy signal frequency for three charging energy signals, in accordance with one example.

As shown in FIG. 12, and with reference to FIG. 3, a power source device such as the lap top 202 can provide multiple charging locations for charging multiple devices at the same time. For example, there are three coils 214, 216, 302 under the skin of the lap top 202 as shown in FIG. 3. Thereby, up to three separate power charge devices can be located in proximity to the lap top 202 to receive inductively coupled charging energy signals that can re-charge corresponding re-chargeable power sources (e.g., re-chargeable batteries) in the up to three power charge devices. The graph in FIG. 12 shows voltage 1202 of three separate inductively transferred charging energy signals 1202, 1204, 1206, relative to the frequency 1200 of the inductively transferred charging energy signals transmitted from the respective coils 214, 216, 302.

Although the optimal location for the up to three power charge devices are indicated by the rectangular dashed lines 214, 216, 302, the three power charge devices could be located at other locations that are sub-optimal (i.e., less than a tightly coupled charging arrangement with the lap top 202) and still receive sufficient charging energy signal to re-charge their respective re-chargeable batteries, for example. The three separate charging energy signals transferred from the three separate coils 214, 216, and 302, according to one embodiment, have non-overlapping individual pass band resonant frequencies (as illustrated in FIG. 12) that can be selected to avoid interference between the three charging energy signals.

Accordingly, the power source device (such as the lap top 202) includes, in one example, three separate coils 214, 216, 302, and associated separate L-C tuned circuits to inductively couple three separate charging energy signals from the three separate coils 214, 216, and 302, at three separate pass band resonant frequencies. As shown in FIG. 12, a first inductively transferred charging energy signal 1202 is transferred from a first coil 214 about a pass band at a first resonant frequency 1203, a second inductively transferred charging energy signal 1204 is transferred from a second coil 216 about a pass band at a second resonant frequency 1205, and a third inductively transferred charging energy signal 1206 is transferred from a third coil 302 about a pass band at a third resonant frequency 1207.

According to various embodiments, the particular individual coils 214, 216, 302, and associated separate L-C tuned circuits, can be tuned by fixed design of the L-C circuit or by a tunable circuit component that can be adjusted by control from a controller, such as the controller 718 and the VFO 719. Additionally, according to various embodiments, the receiver coil 708, and associated L-C tuned circuit, for each of the up to three separate power charge devices 702 (such as the mobile phone 1 device 114 and up to two other such devices) can be tuned by fixed design of the L-C circuit or by a tunable circuit component that can be adjusted by control from a controller, such as the controller 706 and the VFF 730. In the case that one or both of the power charge device 702 and the power source device 704 can adjust a coil's pass band resonant frequency to match the pass band resonant frequency of the coil of the other device 702, 704, the devices 702, 704, according to one embodiment, will communicate with each other (such as via the short range wireless communication transceivers 714, 726) to select the target pass band resonant frequency (e.g., one of a plurality of pass band resonant frequencies possible) and optionally to select one of a plurality of individual coils 214, 216, 302, and associated separate L-C tuned circuits, for use to transfer charging energy signal between the two devices 702, 704, for establishing an inductive coupling charging energy signal arrangement (e.g., a charging arrangement).

Figure 13:
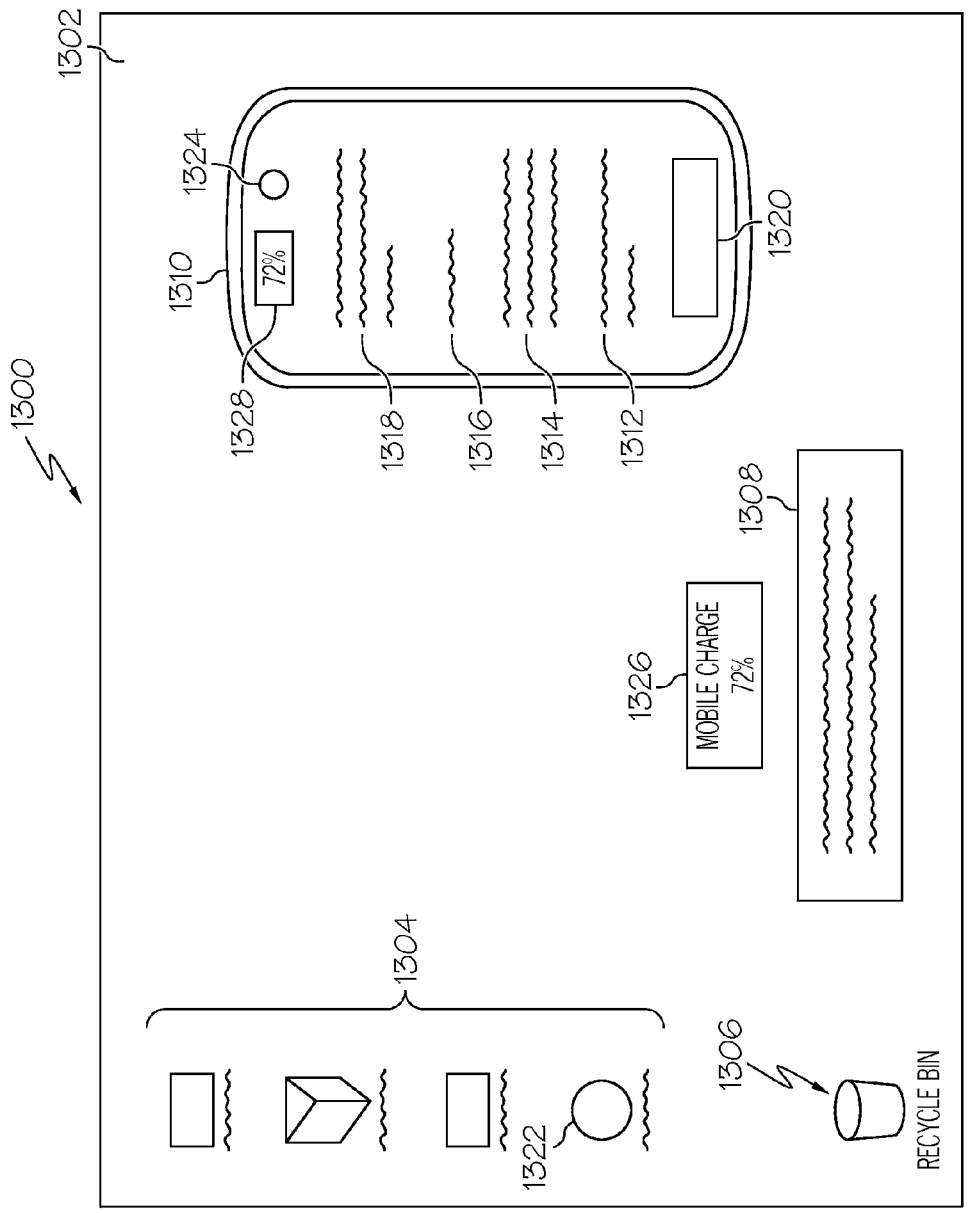
FIG. 13 is a planar view of a user interface display screen, in accordance with one example.

FIG. 13 illustrates a display screen such as at the user interface 734 of the power source device 704 (for example the lap top 202). A user of the lap top 202, for example, can view on a graphical display 1300 an indication of the charge status of a re-chargeable power source at the power charge device 702—such as at the mobile phone 1 device 114 shown in FIG. 1.

The display 1300 includes on the display screen 1302 various icons 1304, 1306 that convey information to a user of the power source device 704. One such icon 1322 can provide an indication to the user that the power charge device 702 is located in a location and arrangement relative to the power source device 704 for tightly coupled inductive transfer of charging energy signal. That is, similar to the discussion with reference to FIG. 11, the icon 1322 corresponds to the indicator 1105, 1109, 1110, that indicates to a user of the lap top 202 when the mobile phone 1 device 114 is optimally located relative to a target charging area 214 (as shown in FIG. 3) of the lap top device 202 for tightly coupled inductive transfer of charging energy signal between the lap top 202 and the mobile phone 1 device 114.

The icon 1322 on the display screen 1302 can be highlighted, such as the indicator 1109 as shown in FIG. 11, to indicate to the user that the two devices 114, 202, are in a tightly coupled inductive energy transfer arrangement (tightly coupled arrangement). When the icon 1322 is not highlighted, such as the indicator 1105, 1110, shown in FIG. 11, the icon 1322 indicates that the two devices are in a loosely coupled inductive energy transfer arrangement (loosely coupled arrangement).

Also, a rectangular dialog box 1326 on the display screen 1302 can show battery charge indication information for the battery of the mobile phone 1 device 114. As shown in FIG. 13, text and numerical information in the dialog box 1326 indicates to the user that the mobile phone 1 device 114 has approximately 72% of a full charge for the re-chargeable battery of the mobile phone 1 device 114. This information can be communicated from the mobile phone 1 device 114 to the lap top 202 in a similar fashion as has been described above with respect to communication of information between the power charge device 702 and the power source device 704 utilizing the short range transceivers 714, 726.

Additionally, a dialog box 1308 on the display screen 1302 can communicate to a user of the lap top 202 the messages that were received by the mobile phone 1 device 114. In this way, the user of the lap top device 202 can utilize a single user interface to receive (and optionally send) messages whether received by the mobile phone 1 device 114 or the lap top 202. That is, the mobile phone 1 device 114, when in a charging arrangement with the lap top 202, can communicate with the lap top 202 via the short range communication transceivers 714, 726, and thereby communicate message information between the devices 114, 202.

The user of both devices 114, 202, can use the display 1300 of the lap top, to receive communication from both the mobile phone 1 device 114 and from the lap top 202. Alternatively, the user of both devices 114, 202, could select to use the display 820 of the mobile phone 1 device 114 as the user interface for receiving messages from both the mobile phone 1 device 114 and the lap top 202. This flexibility allows a user to select a single user interface for communicating messages while the two devices 114, 202 are in a charging arrangement.

Optionally, a user of the lap top 202 can view on the display screen 1302 a graphical representation 1310 of the mobile phone 1 device 114 that is in a charging arrangement with the lap top 202. The user of the lap top 202 thereby can view in the graphical representation 1310 information corresponding to the mobile phone 1 device 114. For example, an indicator 1324 can indicate when the mobile phone 1 device 114 and the lap top 202 are in a tightly coupled charging arrangement or in a loosely coupled charging arrangement similar to the discussion above with respect to icon 1322.

Additionally, a dialog box 1328 in the graphical representation 1310 of the mobile phone 1 device 114 on the display screen 1302 provides charged indication information of the current charge status of the re-chargeable battery 710 of the mobile phone 1 device 114. For example, the dialog box 1328 shows that the re-chargeable battery 710 of the mobile phone 1 device 114 is at approximately 72% of total charge of the battery.

Furthermore, a series of messages 1312, 1314, 1316, 1318, are shown inside the graphical representation 1310 of the mobile phone 1 device 114 such that a user of the lap top 202 can view, for example, a thread of text messaging communicated via the mobile phone 1 device 114 while in a charging arrangement with the lap top 202. Additionally, a dialog box 1320 inside the graphical representation 1310 of the mobile phone 1 device 114 provides another means of communicating messaging information pertaining to the mobile phone 1 device 114 on the display screen 1302 of the lap top 202.

Figure 14:
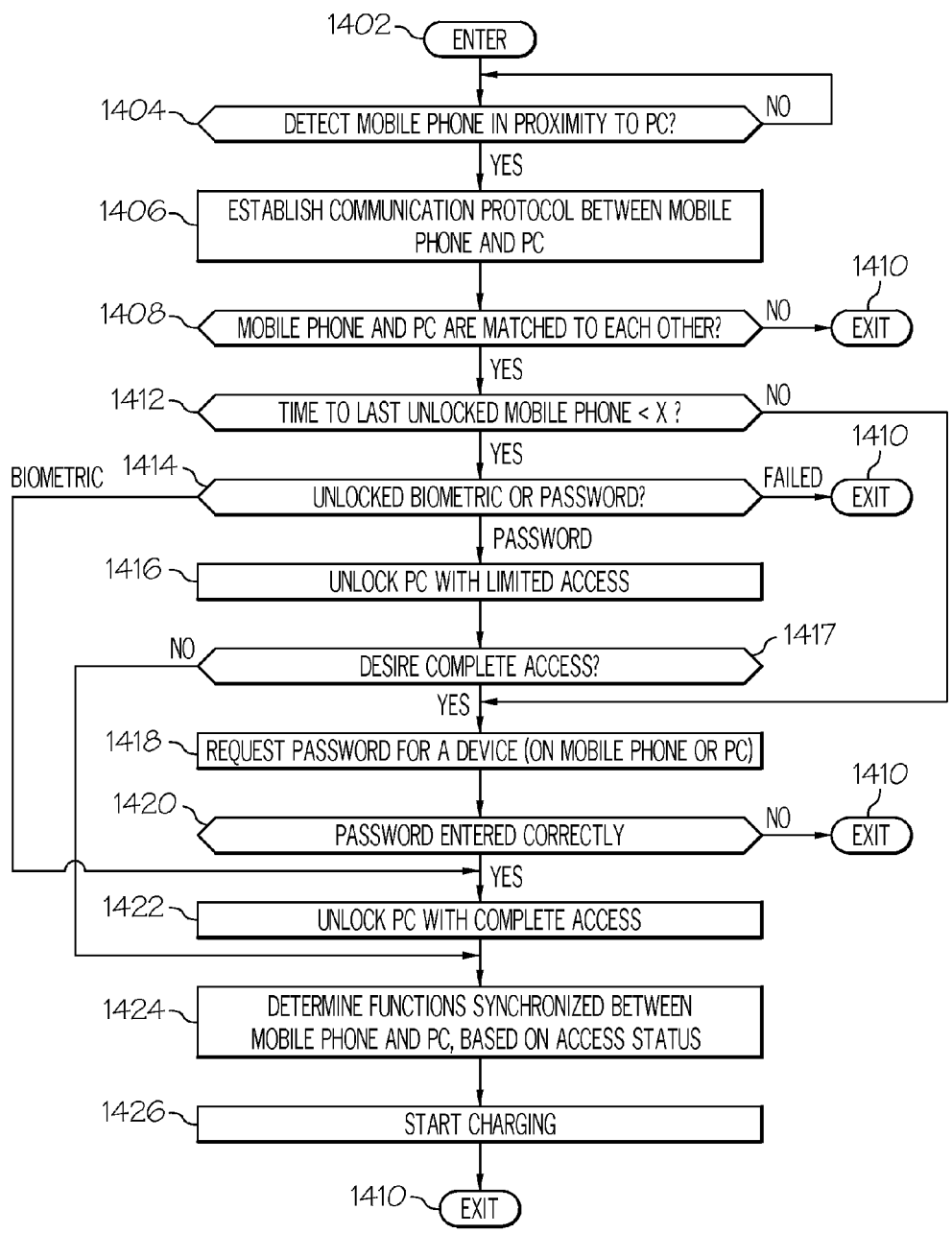
FIGS. 14 to 19 are flow diagrams illustrating various operational flow sequences, in accordance with various examples.

Referring to FIG. 14, an operational sequence for the communication system shown in FIG. 1 is illustrated. After entering the operational sequence, at step 1402, the lap top personal computer (lap top PC) 202 detects the mobile phone 114 in proximity to the lap top personal computer 202, at step 1404. Once detected, at step 1404, the lap top PC 202 establishes communication protocol between the mobile phone 114 and the PC 202, at step 1406. The PC 202 verifies whether the mobile phone 114 is matched to the PC 202 and the mobile phone verifies whether the PC 202 is matched to the mobile phone 114, at step 1408. If the match fails to be determined by both devices, at step 1408, then the operational sequence exits, at step 1410.

Once the two devices are determined to match, at step 1408, the lap top PC 202 determines the amount of time that has elapsed since a last time that the user interface of the mobile phone was unlocked, at step 1412. If the amount of time that has elapsed since the last time that the mobile phone 114 was unlocked is less than a pre-determined value, at step 1412, then the PC 202 determines whether the last time the mobile phone 114 was unlocked was by using biometric or password information, at step 1414.

If the last time the user interface of the mobile phone 114 was unlocked failed to be one of the biometric or password access to unlock of the mobile phone 114, at step 1414, then the operational sequence exits at 1410. If the unlock of the user interface of the mobile phone 114 was with password, at step 1414, then the PC 202 unlocks at least a portion of its user interface with limited access, at step 1416, and requests a password for access to the mobile phone device 114, at step 1418. If the password is entered incorrectly, at step 1420, then the operational sequence exits at 1410. However, if the password is entered correctly, at step 1420, then the operational sequence proceeds to unlock the at least a portion of the user interface of the PC with complete or full access to the mobile phone device 114, at step 1422. If the last time that the user interface of the mobile phone was unlocked was by biometric access, at step 1414, then the PC proceeds to unlock at least a portion of its user interface with complete or full access to the mobile phone 114, at step 1422.

After the PC user interface is unlocked with complete or full access to the mobile phone, at step 1422, the functions between the mobile phone and the lap top PC are synchronized as necessary, at step 1424. Lastly, a separate charging operational sequence (such as will be discussed below with reference to FIG. 15) is started, at step 1426, and then the current operational sequence exits at 1410.

According to one example, a power source device includes a charging power processor configured to: unlock a user interface and allow user access to the at least a portion of user interface, based on a determination from received information from the power charge device that the power charge device has at least one of: a currently unlocked user interface; and a user interface that has been unlocked for at least a predetermined amount of time.

Figure 15:
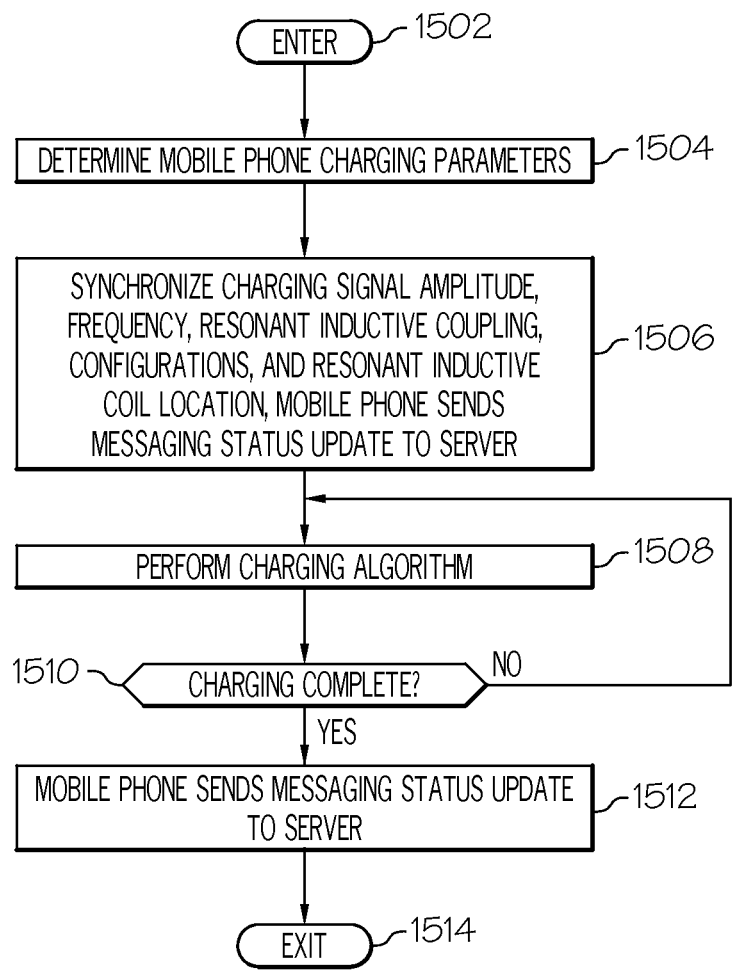

A charging operational sequence is illustrated in FIG. 15. Once the charging sequence is started, at step 1426, the charging sequence, at step 1502, is entered and then proceeds to determine the mobile phone charging parameters, at step 1504. The charging parameters are synchronized between the devices 114, 112, at step 1506. For example, a charging energy signal amplitude, a charging energy signal pass band resonant frequency, a resonant inductive coil location, and other resonant inductive coupling configurations parameters that apply, are synchronized between the devices 114, 112.

The mobile phone 114 then sends a messaging status update to the server (such as the NOC 102 shown in FIG. 1) for the communication system 100. When the mobile phone 114 sends the messaging status update to the server 102, at step 1506, the server 102 updates the device link 1 field 2012 and the status field 2014 in the mobile phone record 2005 in the message synchronization data base 110 with an updated device link 1 field 2012 and an updated status field 2005. For example, the device link 1 field 2012 identifies the lap top PC 112 and the status field 2005 can be set to indicate that the mobile phone 114 is in a charging arrangement with the lap top PC 112.

Additionally, the lap top PC record 2007 can be updated with an updated device link 2 field 2026 (identifying the mobile phone 114) and an updated status field 2028 to indicate that the lap top PC 112 is in a charging arrangement with the mobile phone 114. Other related information corresponding to the PC 112 and the mobile phone 114 may be stored also in the respective records 2005, 2007, in additional fields.

It should be noted that in certain embodiments, an update of a mobile phone record 2005 and of a PC record 2007 may be done at a message synchronization database 110' communicatively coupled with the email server 108 or at a message synchronization database 110" communicatively coupled with the BlackBerry email server 111. Further, it should be understood that according to certain embodiments the lap top PC 112 may send a messaging status update to the server. The messaging status update, whether sent by the lap top PC 112 or by the mobile phone 114, according to various embodiments, can indicate various different information about the lap top PC 112, the mobile phone 114, or both. Such status update may indicate, for example, that the devices 112, 114, are in a charging arrangement. Also, according to another example, the status update sent by either device 112, 114, may indicate that one of the devices 112, 114, is not receiving messages via the wireless network N1 106. Further, according to another example, the status update sent by either device 112, 114, may indicate that one or both of the devices is associated with an account, such as an account associated with a server. Additionally, according to another example, the status update sent by either device 112, 114, may indicate that one of the devices 112, 114, is not receiving messages via the wireless network N1 106 (or another network) that are associated with a particular account associated with the one of the devices 112, 114.

After the devices 114, 112, synchronize with each other, at step 1506, the operational sequence proceeds to perform a charging algorithm at step 1508. The charging algorithm, at step 1508, may include, for example, a sequence where the two devices 112, 114, assist in locating their optimal arrangement (tightly coupled arrangement) for the respective coils 902, 904. An example of this optimal charging arrangement locating process has been discussed above with reference to FIGS. 9 and 10.

After the devices 112, 114, are in a tightly coupled charging arrangement, the charging sequence then can proceed to charge the re-chargeable battery 710 of the mobile phone 114 from the lap top PC 112. Once the charging is determined to be complete, at step 1510, the mobile phone 114 sends a messaging status update message to the server 102, at step 1512, and the operational sequence exits at 1514. It should be noted that in certain embodiments a messaging status update message is sent to the email server 108 communicatively coupled with a message synchronization database 110' and/or to the BlackBerry email server 111 communicatively coupled with a message synchronization database 110".

The server 102 upon receiving the messaging status update message from the mobile phone 114, at step 1512, updates the respective records 2005, 2007, for the mobile phone device 114 and the lap top personal computer 112. In this way, the server 102 in the communication system 100 can keep track of the mobile phone 114 and the lap top PC 112 and when the devices are in a charging arrangement. Optionally, in a similar fashion, the email server 108 and the BlackBerry email server 111 can keep track of the mobile phone 114 and the lap top PC 112 and when the devices are in a charging arrangement.

Figure 16:
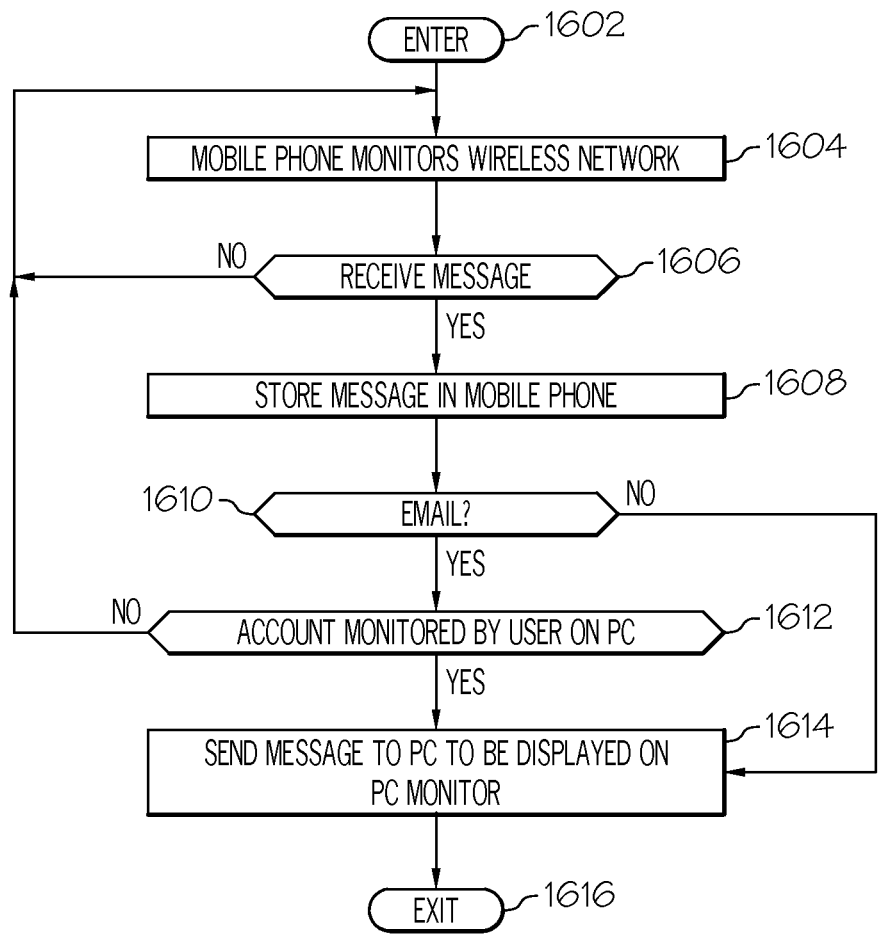

When the mobile phone 114 and the lap top PC 112 are in a charging arrangement, an operational sequence may be followed as shown in the example of FIG. 16. The operational sequence is entered, at step 1602, and then the mobile phone 114 monitors the wireless communication network 106, at step 1604. If the mobile phone 114 determines that it has received a message, at step 1606, the mobile phone 114 stores the message in memory 804, at step 1608.

If the received message is an email message, at step 1610, then the mobile phone 114 determines, at step 1612 whether the email account is being monitored by the user on the lap top PC 112, at step 1612. For example, in the message synchronization database 110"" communicatively coupled with the mobile phone 114 the account identification 1 field 2016 and the account status field 2018 in the data base record 2005 for the mobile phone 114 are checked by the mobile phone 114 to determine whether the email account is also shared by the PC 112, as also indicated by the account identification 1 field 2030 and the account 1 status field 2032 in the data base record 2007 for the PC 112. The account status fields 2018, 2032, indicate whether the email account is being monitored by the user on the lap top PC 112 and on the mobile phone 114. If not being monitored by the user on the lap top PC 112, the email message is processed normally by the mobile phone device 114 and then the operational sequence continues with the mobile phone device 114 monitoring the wireless network 106, at step 1604.

However, if the email account is being monitored by the user on the lap top PC 112, and not on the mobile phone device 114, at step 1612, then the mobile phone device 114, at step 1614, forwards the email message to the lap top PC 112 to be displayed on the display screen 1302 of the PC display monitor (see FIG. 13). The operational sequence then exits, at step 1616. As has been discussed above, the lap top PC 112 can display the email message information to a user by a dialog box 1308 on the display screen 1302. Alternatively, the lap top PC 112 can display the email message information inside of a graphical representation 1310 of the mobile phone device 114 displayed on the display screen 1302. See FIG. 13 for examples. Message information can be presented as a sequence of messages 1312, 1314, 1316, 1318, or as message information within a dialog box 1320 in the graphical representation 1310 of the mobile phone device 114.

According to an alternative embodiment, the PC 112 monitors for received email messages from the second network N2 104. Then, upon receiving an email message the PC 112 determines whether the email account is being monitored by the user on the lap top PC 112, and not being monitored on the mobile phone 114. For example, the database record 2007 in a message synchronization database 110''' communicatively coupled with the PC 112 may show an account status field 2032 that indicates that the PC 112 is receiving email messages from the email account 2030, and the mobile phone 114 is not receiving email messages from the email account 2030. If being monitored by the user on the lap top PC 112, and not on the mobile phone 114, the email message is displayed on the display screen 1302 of the PC display monitor. Further, the PC 112 uses short range communications with the mobile phone 114 to transfer the email message to the mobile phone 114 for storage in the mobile phone 114 without displaying on a display of the mobile phone 114.

Additionally, the message synchronization database 110 may be monitored by the server 102 and thereby the server 102 inhibits wireless transmission of the email message over the first network N1 106 to the mobile phone 114. In this way, the server 102 avoids wirelessly transmitting duplicate email messages to the mobile phone 114, which have been sent to the PC 112 via the second network N2 104 and transferred from the PC 112 to the mobile phone 114 via short range communication link 115. This enhances utilization of the resources of the wireless network 106 and increases messaging throughput in the first network N1 106.

Furthermore, in the embodiments with the email server 108 being communicatively coupled with a message synchronization database 110' the email server 108 inhibits transmission of the email message to the NOC 102 and thereby avoids wireless transmission of the email message over the first network N1 106 to the mobile phone 114. Similarly, in the embodiments with the BlackBerry email server 111 being communicatively coupled with a message synchronization database 110" the BlackBerry email server 111 inhibits transmission of the email message to the NOC 102 and thereby avoids wireless transmission of the email message over the first network N1 106 to the mobile phone 114.

Figure 17:
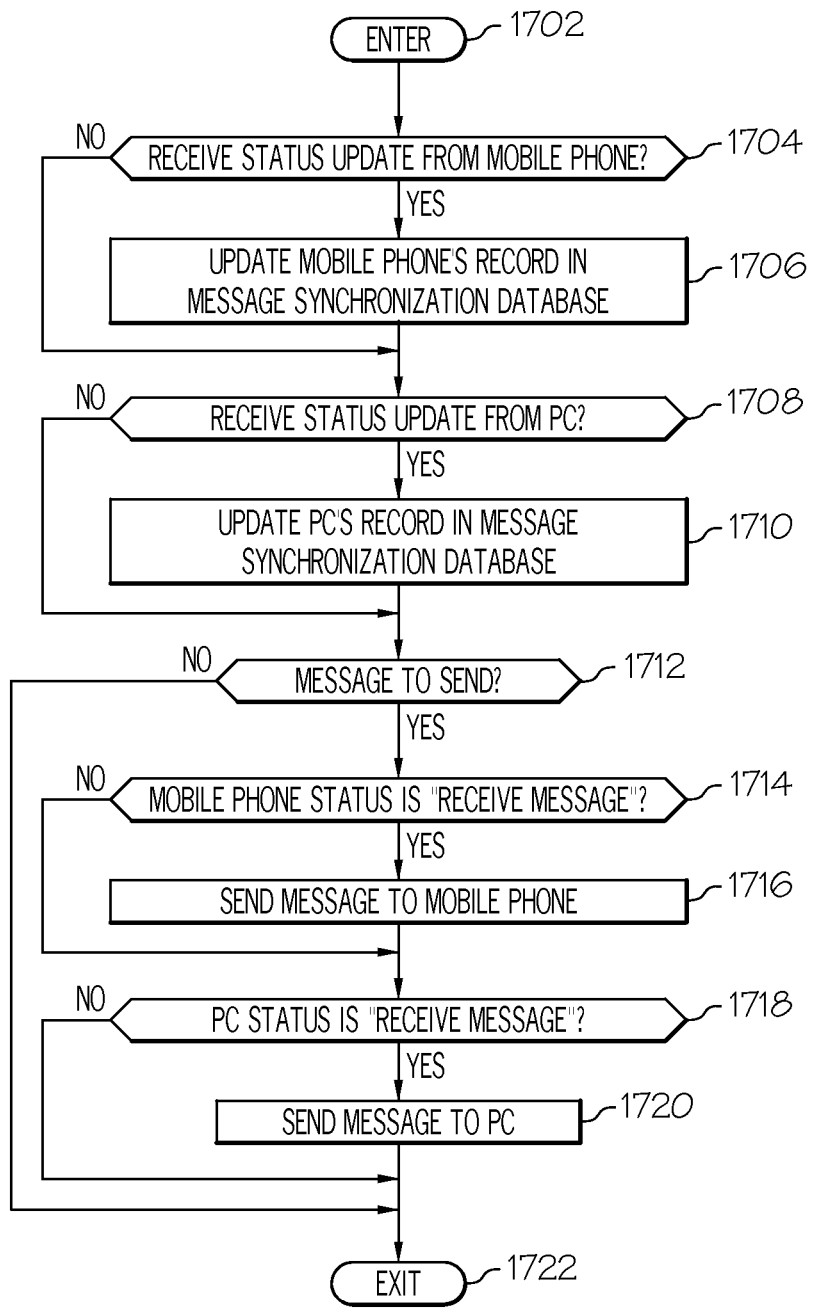

Referring to FIG. 17, an example of an operational sequence with the server 102 in the communication system 100 of FIG. 1 is shown. The operational sequence is entered, at step 1702, and then the server 102 monitors for receipt of status updates from the mobile phone device 114, at step 1704. If the server 102 receives a status update from the mobile phone device 114, at step 1704, then the server 102 updates the mobile phone device's record 116 in the message synchronization database 110, at step 1706.

Alternatively, the server 102 checks whether it has received a status update from the lap top PC 112, at step 1708. If the server has received a status update from the lap top PC 112, at step 1708, then the server 102 updates the lap top PC's record 2007 in the message synchronization database 110 (see FIG. 20).

Optionally, when the server 102 updates the mobile phone device's record 2005, at step 1706, or updates the lap top PC's record 2007, at step 1710, the server 102, according to one embodiment, may additionally update the associated record of the other device 2007, 2005, that is in a charging arrangement therewith. That is, the server 102 may contemporaneously update both records for the mobile phone device 114 and the lap top PC 112.

It should be noted that in embodiments where the email server 108 is communicatively coupled with a message synchronization database 110' the email server 108 may receive update messages from the mobile phone 114 and/or from the PC 112. In similar fashion to the discussion above, the email server 108 may update the data base records 2005, 2007 in the message synchronization database 110'.

Also, in embodiments where the BlackBerry email server 111 is communicatively coupled with a message synchronization database 110" the BlackBerry email server 111 may receive update messages from the mobile phone 114 and/or from the PC 112. In similar fashion to the discussion above, the BlackBerry email server 111 may update the data base records 2005, 2007 in the message synchronization database 110".

Continuing with the present example, when the server 102, at step 1712, determines that the email server 108 has an email message to send to the mobile phone device 114, then the server 102 further determines whether the mobile phone device's status 2014 in the respective record 2005 in the messaging synchronization database 110 indicates a messaging status for receiving messages, at step 1714. If the indication is that the mobile phone device 114 is receiving messages, at step 1714, then the server 102 sends the email message from the email server 108 to the mobile phone device 114, at step 1716.

However, if the mobile phone device's status 2014 in the respective record 2005 indicates that the mobile phone device 114 is not receiving email messages, at step 1714, then the server 102 inhibits transmission of the email message that is destined for reception by the mobile phone device 114.

The server 102 checks the personal computer status 2028 in the respective record 2007 in the messaging synchronization database 110 to determine whether the lap top PC 112 is receiving messages, at step 1718. If the lap top PC 112 is receiving messages, at step 1718, then the server 102 sends the email message, such as from the email server 108, to the lap top PC 112, at step 1720, and then exits the operational sequence, at step 1722.

However, if the personal computer status 2028 in the respective record 2007 in the messaging synchronization database 110 indicates that the lap top PC 112 is not receiving email messages, at step 1718, then the server 102 inhibits transmission of the email message that is destined for reception by the lap top PC 112.

It should be noted that the server 102 can pro-actively manage and reduce duplicate transmissions of messages being sent to the two devices 112, 114, that are in a charging arrangement. That is, while the user is using a single user interface for both devices 112, 114, the server 102 can limit transmission of email messages to only the one device (either one of the devices 112, 114) that is receiving email messages. The devices 112, 114, could optionally synchronize and transmit received messages between the two devices using short range wireless communication link 115. This message reception status synchronization mechanism between the devices 112, 114, and the server 102, reduces the amount of duplicate transmission of messages delivered via the various networks 104, 106. It can thereby increase message throughput for the communication channels of the various networks 104, 106, making communication system operation more efficient. Additionally, according to various embodiments, it can reduce the amount of resources used by the device that has a status of not receiving email messages, e.g., reduced memory consumption that would be used for storing the received messages and/or reduced battery consumption for reception of the messages such as via wireless communication. Particularly in limited message throughput networks, such as the wireless network N1 106, by reducing the number of wireless transmissions of messages it increases overall messaging throughput for the wireless network N1. It can also make available networking resources for more efficient transmission of other information in the wireless network N1 106.

Lastly, in view of the discussion above, it should be understood that in embodiments where the email server 108 is communicatively coupled with a message synchronization database 110' the email server 108 can pro-actively manage and reduce duplicate transmissions of messages being sent to the two devices 112, 114, that are in a charging arrangement. Similarly, in embodiments where the BlackBerry email server 111 is communicatively coupled with a message synchronization database 110" the BlackBerry email server 111 can pro-actively manage and reduce duplicate transmissions of messages being sent to the two devices 112, 114, that are in a charging arrangement.

Figure 18:
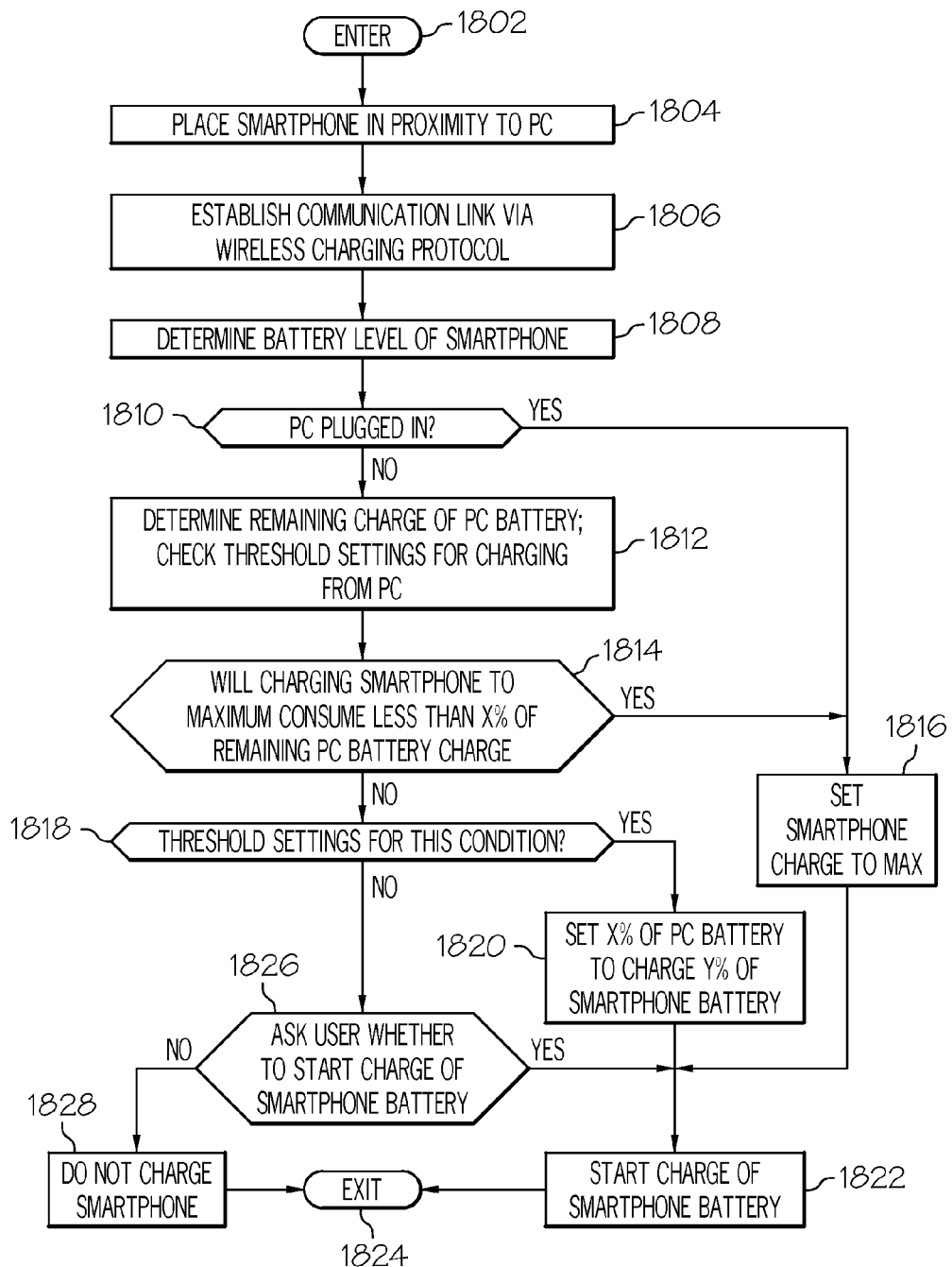
Figure 19:
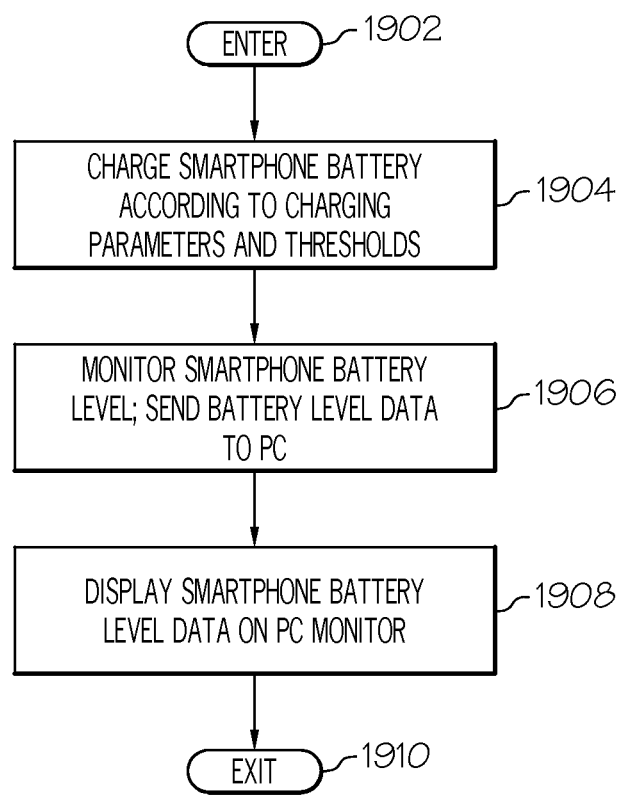

FIGS. 18 and 19 constitute portions of an overall operational sequence for charging a Smartphone 114 from a PC device 112, according to one embodiment. With reference to FIG. 18, the operational sequence is entered, at step 1802, and proceeds to determine whether a Smartphone 114 is located in proximity to the personal computer 112, at step 1804. The devices 112, 114, then establish a communication link 115 via the short range communication transceivers 714, 726, and proceed with a wireless charging protocol, at step 1806.

The personal computer (PC) 112 determines the battery level of the Smartphone battery 710 by communication with the Smartphone 114, at step 1808. The PC 112, at step 1810, then determines whether it is plugged into an AC outlet, at step 1810. If the PC 112 is plugged into an AC outlet, at step 1810, then the PC 112 charges the Smartphone 114 according to a maximum charging protocol to charge the battery of the Smartphone to 100% of capacity, at step 1816. The operational sequence then starts charging the Smartphone battery 710, at step 1822, and then the operational sequence exits, at step 1824.

However, if the PC 112 is not plugged into an AC outlet, at step 1810, then the PC 112 determines the remaining charge of the PC battery 404 and checks the threshold settings and charging parameters for charging from the personal computer 112, at step 1812. If the personal computer 112 determines that charging the Smartphone 114 to a maximum (100% of its re-chargeable battery 710) will consume less than a certain percentage threshold of the remaining charge of the PC battery 404, at step 1814, then the personal computer 112 sets the charging of the Smartphone 114 to a maximum 100%, at step 1816. The PC 112 then starts charging the Smartphone battery 710, at step 1822, and exits the operational sequence, at step 1824.

If, however, the personal computer 112 determines that charging the Smartphone to substantially 100% of capacity of its battery 710 will consume at least a pre-determined threshold percentage of the remaining charge of the personal computer battery 404, at step 1814, then the personal computer 112 determines whether there are threshold settings for this condition, at step 1818. If there are threshold settings, at step 1818, then the personal computer 112 sets a percentage of the charge of the personal computer battery 404 to be used to charge a percentage of the Smartphone battery 710, at step 1820, and then starts charging the Smartphone battery 710, at step 1822. The PC 112 then exits the operational sequence, at step 1824.

If, however, the PC 112 does not find threshold settings for this condition, at step 1818, then the personal computer 112, at step 1826, asks the user whether to start charging the Smartphone battery 710. The personal computer 112, at step 1826, prompts the user via the graphical display 1302 with a message in a dialog box 1308. The user then may respond by entering user input information via a user input device at the personal computer 112 such as via the keyboard 210.

If the user instructs the personal computer 112 to start charging the Smartphone device 114, at step 1826, then the personal computer starts the charge sequence, at step 1822, and then exits the operational sequence at step 1824. Alternatively, if the user does not affirmatively instruct the personal computer 112 to start charging the Smartphone battery 710, at step 1826, then the personal computer 112 will not charge the Smartphone 114, at step 1828, and exits the operational sequence, at step 1824.

Referring to FIG. 19, the operational sequence is entered, at step 1902, and proceeds to charge the Smartphone battery 710 according to charging parameters and thresholds that have been set, at step 1904. While charging the Smartphone battery 710, at step 1906, the power controller 706 in the Smartphone 114 uses the sensor 712 to monitor the level of charge of the Smartphone's battery 710 and the Smartphone 114 sends (such as via short range wireless communication) battery level data to the personal computer 112, at step 1906. The personal computer 112, at step 1908, displays the Smartphone battery level data to the user on the PC monitor display screen 1302. The operational sequence then exits, at step 1910.

Information Processing System

The present subject matter can be realized in hardware, software, or a combination of hardware and software. A computer system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embodied in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include a non-transitory medium such as a computer readable storage medium embodying non-volatile memory, such as read-only memory (ROM), flash memory, disk drive memory, CD-ROM, and other permanent storage. Additionally, a non-transitory medium may include volatile storage such as RAM, buffers, cache memory, and network circuits. Furthermore, according to certain alternative embodiments, the computer readable medium may comprise computer readable information in a transitory state medium such as a network link and/or a network interface, including a wired network or a wireless network that allow a computer to read such computer readable information.

A Wireless Communication Device Example

A) According to various embodiments of the present disclosure, a wireless communication device comprises:
  a re-chargeable power source;
  an electronic circuit powered by the re-chargeable power source;
  an inductive wireless power receiving circuit having a pass band about a resonant frequency, electrically coupled with the re-chargeable power source, for wirelessly receiving a charging energy signal having a frequency substantially within the pass band about the resonant frequency and selectively coupling charging energy from the received charging energy signal to the re-chargeable power source; and
  a charging power controller, communicatively coupled with the inductive wireless power receiving circuit, the charging power controller configured to:
    control the inductive wireless power receiving circuit, based on determining that the wireless communication device is in a charging arrangement with a power source device, to transfer charging energy from the received charging energy signal to the re-chargeable power source.

B) The wireless communication device of A), further comprising:
  a short range wireless communication transceiver, communicatively coupled with the charging power controller, the charging power controller further configured to:
    communicate with the power source device via the short range wireless communication transceiver, and
    provide an indication of a charge status of the re-chargeable power source to the power source device.

C) The wireless communication device of A) further comprising:
  a short range wireless communication transceiver, communicatively coupled with the charging power controller, the charging power controller further configured to:
    communicate with the power source device via the short range wireless communication transceiver to provide to the power source device an indication of a value of the received charging energy signal.

D) The wireless communication device of C), wherein the charging power controller repeatedly providing to the power source device via the short range wireless communication transceiver an indication of a current value of the received charging energy signal.

E) The wireless communications device of A), further comprising:
  a user interface, communicatively coupled with the charging power controller, the charging power controller further configured to:
    provide to the user interface an indication of a value of the received charging energy signal.

F) The wireless communications device of E), wherein the charging power controller further configured to:
  provide to the user interface a visual representation of a value of the received charging energy signal.

G) The wireless communications device of F), wherein the visual representation comprises a bar graph representing a value of the received charging energy signal.

H) The wireless communications device of claim A), further comprising:
  a user interface, communicatively coupled with the charging power controller, the charging power controller further configured to:
    determine, based on a monitored value of the received charging energy signal, whether the wireless communication device is in a charging arrangement with the power source device; and
    provide to the user interface an indication of a determination whether the wireless communications device is in a charging arrangement with the power source device.

I) The wireless communications device of H), wherein the charging power controller being configured to:
  provide to the user interface a visual indicator indicating the determination whether the wireless communications device is in a charging arrangement with the power source device.

J) The wireless communications device of A), further comprising:
  a short range wireless communication transceiver, communicatively coupled with the charging power controller; and
  the charging power controller further configured to:
    communicate with the power source device via the short range wireless communication transceiver, and
    in response to determining that the wireless communication device is in a charging arrangement with the power source device, wirelessly receive at least one information signal by the short range wireless communication transceiver, the at least one information signal comprising a message received by the power source device and thereby forwarded to the wireless communication device.

K) The wireless communications device of A), further comprising:
  a short range wireless communication transceiver, communicatively coupled with the charging power controller;
  a long range wireless communication transceiver, communicatively coupled with the charging power controller; and
  the charging power controller further configured to:
    communicate with the power source device via the short range wireless communication transceiver to provide to the power source device a representation of message information received by the wireless communication device via the long range wireless communication transceiver.

L) The wireless communications device of K), wherein the power source device comprises a personal computer and the wireless communication device comprises a mobile phone.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A power source device communicatively coupled with at least one of a first communication network and a wireless communication network, the power source device comprising:
    a power source;
    a short range wireless communication receiver for wirelessly receiving information signals transmitted from at least one power charge device, the power charge device being communicatively coupled with the wireless communication network;
    a wireless power transmitting circuit, the wireless power transmitting circuit having a frequency pass band about a resonant frequency and electrically coupled with the power source, for selectively coupling charging energy from the power source to the wireless power transmitting circuit and thereby wirelessly transmitting a charging energy signal having a frequency substantially within the frequency pass band; and
    a charging power controller, communicatively coupled with the wireless power transmitting circuit and the short range wireless communication receiver, the charging power controller configured to:
        wirelessly receive, by the short range wireless communication receiver, at least one information signal transmitted from the at least one power charge device, the information signal indicating that 1) the power charge device is in a power charging arrangement with the power source device, 2) the power charge device is not receiving one or more messages via the wireless communication network, and 3) the power source device is to forward to the power charge device the one or more messages that are received by the power source device from the at least one of the first communication network and the wireless communication network;
        based on wirelessly receiving the information signal, forwarding to the power charge device the one or more messages that are received by the power source device;
        determine whether the at least one power charge device is in a charging arrangement with the power source device;
        selectively couple charging energy from the power source to the wireless power transmitting circuit; and
        control the wireless power transmitting circuit to wirelessly transmit the charging energy signal having a frequency substantially within the frequency pass band.

2. The power source device of claim 1, further comprising:
    a short range wireless communication transmitter for wirelessly transmitting information signals to the at least one power charge device, the charging power controller being communicatively coupled with the short range wireless communication transmitter, the charging power controller being further configured to:
        wirelessly transmit at least one information signal from the short range wireless communication transmitter to the at least one power charge device, the at least one information signal indicating that the at least one power charge device is determined to be in a charging arrangement with the power source device.

3. The power source device of claim 1, wherein the charging power controller being further configured to:
    wirelessly receive by the short range wireless communication receiver a charging status information signal from the at least one power charge device, the charging status information signal providing an indication of a charge level of a rechargeable power source in the at least one power charge device.

4. The power source device of claim 1, wherein the charging power controller being further configured to:
    wirelessly receive by the short range wireless communication receiver a charging status information signal from the at least one power charge device, the charging status information signal providing an indication of a charging status of a rechargeable power source in the at least one power charge device.

5. The power source device of claim 1, wherein the charging power controller being further configured to:
    in response to determining that the at least one power charge device is in a charging arrangement with the power source device, wirelessly receive, by the short range wireless communication receiver, an information signal from the at least one power charge device, the information signal comprising a message received by the at least one power charge device and thereby forwarded to the power source device.

6. The power source device of claim 5, further comprising:
    a user interface, communicatively coupled with the charging power controller, the charging power controller further configured to:
        provide to the user interface the message received by the power source device.

7. The power source device of claim 5, wherein the at least one power charge device comprises at least one wireless communication device and the information signal is wirelessly received therefrom by the short range wireless communication receiver, and the information signal comprises a message wirelessly received from a wireless communication system by the at least one wireless communication device and thereby forwarded to the power source device; and further wherein the power source device comprises:
    a user interface, communicatively coupled with the charging power controller, the charging power controller further configured to:
        provide to the user interface the message received by the power source device.

8. The power source device of claim 1, further comprising:
    a short range wireless communication transmitter for wirelessly transmitting at least one information signal to the at least one power charge device, the charging power controller being communicatively coupled with the short range wireless communication transmitter, the charging power controller being further configured to:

in response to determining that the at least one power charge device is in a charging arrangement with the power source device, wirelessly transmit at least one information signal by the short range wireless communication transmitter to the at least one power charge device, the at least one information signal comprising the one or more messages received by the power source device and thereby forwarded to the at least one power charge device.

9. The power source device of claim 8, further comprising:
a user interface, communicatively coupled with the charging power controller, the charging power controller further configured to:
provide to the user interface the message received by the power source device.

10. The power source device of claim 9, wherein the power source device comprises a personal computer and the at least one power charge device comprises at least one mobile phone.

11. The power source device of claim 10, wherein the user interface comprises a display, and the message received by the power source device is displayed on the display.

12. A power source device for inductively coupling charging energy signal to a power charge device, the power source device communicatively coupled with at least one of a first communication network and a wireless communication network, the power charge device communicatively coupled with the wireless communication network, the power source device comprising:
a power source;
an inductive wireless power transmitting circuit having a pass band about a resonant frequency, electrically coupled with the power source, for selectively transferring charging energy from the power source to the inductive wireless power transmitting circuit and thereby wirelessly inductively transmitting a charging energy signal having a frequency substantially within the pass band about the resonant frequency;
a charging power controller, communicatively coupled with the inductive wireless power transmitting circuit, the charging power controller configured to:
control the inductive wireless power transmitting circuit, based on determining that the power source device is in a charging arrangement with a power charge device, to selectively transfer charging energy from the power source to the inductive wireless power transmitting circuit and thereby wirelessly inductively transmitting a charging energy signal for reception by the power charge device;
a user interface that is lockable to prevent user access to at least a portion of the user interface; and
a short range wireless communication transceiver, communicatively coupled with the charging power controller, the charging power controller further configured to:
unlock the user interface and allow user access to the at least a portion of user interface, based on receiving information from the power charge device via the short range wireless communication transceiver and determining that the power source device and the power charge device are in a charging arrangement;
wirelessly receive, by the short range wireless communication transceiver, at least one information signal transmitted from the at least one power charge device, the information signal indicating that 1) the power charge device is in a power charging arrangement with the power source device, 2) the power charge device is not receiving one or more messages via the wireless communication network, and 3) the power source device is to forward to the power charge device the one or more messages that are received by the power source device from the at least one of the first communication network and the wireless communication network; and
based on wirelessly receiving the information signal, forwarding to the power charge device the one or more messages that are received by the power source device.

13. The power source device of claim 12, wherein the charging power controller is further configured to:
unlock the user interface and allow user access to the at least a portion of user interface, based on receiving information from the power charge device via the short range wireless communication transceiver indicating that the power charge device has at least one of:
a currently unlocked user interface; and
a user interface that has been unlocked for at least a predetermined amount of time.

14. The power source device of claim 12, wherein the charging power controller is further configured to:
unlock the user interface and allow limited user access to the at least a portion of user interface, based on receiving information from the power charge device via the short range wireless communication transceiver indicating that the power charge device has a user interface that has been unlocked for at least a predetermined amount of time by receipt of a password.

15. The power source device of claim 12, wherein the charging power controller is further configured to:
unlock the user interface and allow user access to the at least a portion of user interface, based on receiving information from the power charge device via the short range wireless communication transceiver indicating that the power charge device has a user interface that has been unlocked for at least a predetermined amount of time, wherein the charging power controller
allows limited access by a user to the at least a portion of user interface based on determination that the power charge device has a user interface that has been unlocked by receipt of a password; and
allows full access by a user to the at least a portion of user interface based on determination that the power charge device has a user interface that has been unlocked by capture of user biometric information.

16. A wireless communication device communicatively coupled with a wireless communication network, and a power source device being communicatively coupled with at least one of a first communication network and the wireless communication network, the wireless communication device comprising:
a re-chargeable power source;
an electronic circuit powered by the re-chargeable power source;
a short range wireless communication transceiver;
an inductive wireless power receiving circuit having a pass band about a resonant frequency, electrically coupled with the re-chargeable power source, for wirelessly receiving a charging energy signal having a frequency substantially within the pass band about the resonant frequency and selectively coupling charging energy from the received charging energy signal to the re-chargeable power source; and
a charging power controller, communicatively coupled with the inductive wireless power receiving circuit and the short range wireless communication transceiver, the charging power controller configured to:
- control the inductive wireless power receiving circuit, based on determining that the wireless communication device is in a charging arrangement with a power source device, to transfer charging energy from the received charging energy signal to the re-chargeable power source; and
- wirelessly transmit, by the short range wireless communication transceiver, an information signal destined for reception by the power source device, the information signal indicating that 1) the wireless communication device is in a power charging arrangement with the power source device, 2) the wireless communication device is not receiving one or more messages via the wireless communication network, and 3) the power source device is to forward to the wireless communication device the one or more messages that are received by the power source device from the at least one of the first communication network and the wireless communication network.

17. The wireless communications device of claim 16, further comprising:
- a long range wireless communication transceiver, communicatively coupled with the charging power controller; and
- the charging power controller further configured to:
  - communicate with the power source device via the short range wireless communication transceiver to provide to the power source device a representation of message information received by the wireless communication device via the long range wireless communication transceiver.

18. A method with a power source device, the method comprising:
- establishing a wireless charging protocol between a power source device and a power charge device;
- inductively wirelessly transmitting a charging energy signal from an inductive wireless power transmitting circuit;
- determining whether the power source device is in a charging arrangement with the power charge device;
- in response to determining that the power source device is in a charging arrangement with the power charge device, wirelessly receiving information from the power charge device via short range wireless communication, the wirelessly received information indicating a lock-unlock status of a user interface associated with the power charge device;
- unlocking at least a portion of a user interface associated with the power source device and allowing user access to the at least a portion of the user interface, based on receiving information from the power charge device via short range wireless communication indicating that the power charge device has at least one of:
  - a currently unlocked user interface; and
  - a user interface that has been unlocked for at least a predetermined amount of time; and
- in response to determining that the power source device is in a charging arrangement with the power charge device, wirelessly receiving via short range wireless communication an information signal transmitted from the power charge device, the information signal indicating that 1) the power charge device is in a power charging arrangement with the power source device, 2) the power charge device is not receiving one or more messages via the wireless communication network, and 3) the power source device is to forward to the power charge device the one or more messages that are received by the power source device from the at least one of the first communication network and the wireless communication network; and
- based on wirelessly receiving the information signal, forwarding to the power charge device the one or more messages that are received by the power source device.

19. The method of claim 18, wherein the allowing user access to the at least a portion of the user interface comprises
- displaying on a display screen message information received from the power charge device via short range wireless communication, the received message information including at least an indication of one or more messages received by the power charge device from a wireless communication network.

20. The method of claim 19, wherein the received message information including one or more messages received by the power charge device from the wireless communication network.

21. The method of claim 20, wherein the displaying comprises displaying the message information in a graphical representation of the power charge device also displayed on the display screen.

* * * * *